(12) United States Patent
Zhang et al.

(10) Patent No.: US 12,222,469 B2
(45) Date of Patent: Feb. 11, 2025

(54) OPTICAL IMAGING LENS ASSEMBLY

(71) Applicant: ZHEJIANG SUNNY OPTICS CO., LTD., Zhejiang (CN)

(72) Inventors: Shuang Zhang, Zhejiang (CN); Xiaobin Zhang, Zhejiang (CN); Jianke Wenren, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 611 days.

(21) Appl. No.: 17/525,993

(22) Filed: Nov. 15, 2021

(65) Prior Publication Data

US 2022/0155564 A1    May 19, 2022

(30) Foreign Application Priority Data

Nov. 19, 2020  (CN) .......................... 202011305040.9

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .. G02B 13/00; G02B 13/0045; G02B 13/005; G02B 9/64; G02B 9/62; G02B 9/34; G02B 3/02; G02B 13/18; G02B 13/24; G02B 27/0025; G02B 21/02; G02B 5/00; G02B 5/005; G02B 5/208
USPC ....... 359/708, 700, 713, 751, 755, 754, 642, 359/657, 682
See application file for complete search history.

(56) References Cited

U.S. PATENT DOCUMENTS

2019/0227277 A1* 7/2019 Tang .................... G02B 9/64
2019/0369368 A1* 12/2019 Jung .................... G02B 3/02

OTHER PUBLICATIONS

ThorLabs catalog V21, Thorlabs Inc. 2011 (Year: 2011).*

* cited by examiner

*Primary Examiner* — Jie Lei
(74) *Attorney, Agent, or Firm* — Samson G. Yu

(57) ABSTRACT

The disclosure discloses an optical imaging lens assembly, which sequentially includes, from an object side to an image side along an optical axis: a first lens with a positive refractive power; a variable diaphragm; a second lens; a third lens; a fourth lens; a fifth lens with a negative refractive power; a sixth lens with a positive refractive power; and a seventh lens with a negative refractive power. EPDmax is a maximum entrance pupil diameter of the optical imaging lens assembly, EPDmin is a minimum entrance pupil diameter of the optical imaging lens assembly, and EPDmax, EPDmin and a total effective focal length f of the optical imaging lens assembly meet $3.0 < f/(EPDmax - EPDmin) < 6.0$.

14 Claims, 24 Drawing Sheets

OPTICAL IMAGING LENS ASSEMBLY

CROSS-REFERENCE TO RELATED APPLICATIONS

The disclosure claims priority to Chinese Patent Application No. 202011305040.9, filed to the National Intellectual Property Administration, PRC (CNIPA) on Nov. 19, 2020, the disclosure of which is hereby incorporated by reference in its entirety.

TECHNICAL FIELD

The disclosure relates to the field of optical elements, and more particularly to an optical imaging lens assembly.

BACKGROUND

In recent years, portable electronic products with camera functions have gradually emerged, and optical imaging lens assembly, as an important part of a camera system, has also gradually attracted the attention of the masses.

With the rapid development of camera systems of portable electronic products, higher requirements have been made to optical imaging lens assemblies. In order to achieve high imaging quality, more and more complex optical structural designs are adopted for optical imaging lens assemblies. However, a complex design may usually enlarge an optical imaging lens assembly and is further unfavorable for the miniaturization of the product.

Therefore, there is an urgent need for a small and ultra-thin optical imaging lens assembly with a large image surface.

SUMMARY

An embodiment of the disclosure provides an optical imaging lens assembly, which sequentially includes, from an object side to an image side along an optical axis: a first lens with a positive refractive power, a variable diaphragm, a second lens, a third lens, a fourth lens, a fifth lens with a negative refractive power, a sixth lens with a positive refractive power, and a seventh lens with a negative refractive power. EPDmax is a maximum entrance pupil diameter of the optical imaging lens assembly, EPDmin is a minimum entrance pupil diameter of the optical imaging lens assembly, and EPDmax, EPDmin and a total effective focal length f of the optical imaging lens assembly may meet $3.0<f/(EPDmax-EPDmin)<6.0$.

In an implementation mode, an object-side surface of the second lens may be a convex surface, while an image-side surface may be a concave surface. An object-side surface of the third lens may be a convex surface, while an image-side surface may be a concave surface.

In an implementation mode, EPDmax is the maximum entrance pupil diameter of the optical imaging lens assembly, and an effective focal length f1 of the first lens and EPDmax may meet $1.2<f1/EPDmax<1.8$.

In an implementation mode, ΔDT is a maximum variation of a clear aperture of the variable diaphragm, and a total effective focal length f of the optical imaging lens assembly and ΔDT may meet $7<f/ΔDT<9$.

In an implementation mode, an effective focal length f2 of the second lens, an effective focal length f5 of the fifth lens and an effective focal length f3 of the third lens may meet $0.5<(f2+f5)/f3<1.5$.

In an implementation mode, a curvature radius R14 of an image-side surface of the seventh lens, a curvature radius R13 of an object-side surface of the seventh lens and an effective focal length f7 of the seventh lens may meet $0.3<(R14-R13)/f7<2.1$.

In an implementation mode, a curvature radius R5 of an object-side surface of the third lens, a curvature radius R6 of an image-side surface of the third lens, a curvature radius R3 of an object-side surface of the second lens and a curvature radius R4 of an image-side surface of the second lens may meet $1.4<(R5+R6)/(R3-FR4)<2.1$.

In an implementation mode, a center thickness CT1 of the first lens on the optical axis, a center thickness CT5 of the fifth lens on the optical axis and a center thickness CT6 of the sixth lens on the optical axis may meet $0.9<CT1/(CT5+CT6)<1.3$.

In an implementation mode, a combined focal length f12 of the first lens and the second lens and a combined focal length f56 of the fifth lens and the sixth lens may meet $1.3<f12/f56<1.8$.

In an implementation mode, SAG52 is an on-axis distance from an intersection point of an image-side surface of the fifth lens and the optical axis to an effective radius vertex of the image-side surface of the fifth lens, SAG51 is an on-axis distance from an intersection point of an object-side surface of the fifth lens and the optical axis to an effective radius vertex of the object-side surface of the fifth lens, and SAG52 and SAG51 may meet $1.2<SAG52/SAG51<1.8$.

In an implementation mode, SAG62 is an on-axis distance from an intersection point of an image-side surface of the sixth lens and the optical axis to an effective radius vertex of the image-side surface of the sixth lens, SAG71 is an on-axis distance from an intersection point of an object-side surface of the seventh lens and the optical axis to an effective radius vertex of the object-side surface of the seventh lens, and a spacing distance T67 of the sixth lens and the seventh lens on the optical axis, SAG62 and SAG71 may meet $1.8<T67/(SAG62-SAG71)<2.8$.

Another embodiment of the disclosure provides an optical imaging lens assembly, which sequentially includes, from an object side to an image side along an optical axis: a first lens with a positive refractive power, a variable diaphragm, a second lens, a third lens, a fourth lens, a fifth lens with a negative refractive power, a sixth lens with a positive refractive power, and a seventh lens with a negative refractive power. EPDmax is a maximum entrance pupil diameter of the optical imaging lens assembly, and an effective focal length f1 of the first lens and EPDmax may meet $1.2<f1/EPDmax<1.8$.

In an implementation mode, an object-side surface of the second lens is a convex surface, while an image-side surface is a concave surface. An object-side surface of the third lens is a convex surface, while an image-side surface is a concave surface.

In an implementation mode, EPDmax is the maximum entrance pupil diameter of the optical imaging lens assembly, EPDmin is a minimum entrance pupil diameter of the optical imaging lens assembly, and EPDmax, EPDmin and a total effective focal length f of the optical imaging lens assembly may meet $3.0<f/(EPDmax-EPDmin)<6.0$.

In an implementation mode, ΔDT is a maximum variation of a clear aperture of the variable diaphragm, and a total effective focal length f of the optical imaging lens assembly and ΔDT may meet $7<f/ΔDT<9$.

In an implementation mode, an effective focal length f2 of the second lens, an effective focal length f5 of the fifth lens and an effective focal length f3 of the third lens may meet 0.5<(f2+f5)/f3<1.5.

In an implementation mode, a curvature radius R14 of an image-side surface of the seventh lens, a curvature radius R13 of an object-side surface of the seventh lens and an effective focal length f7 of the seventh lens may meet 0.3<(R14−R13)/f7<2.1.

In an implementation mode, a curvature radius R5 of an object-side surface of the third lens, a curvature radius R6 of an image-side surface of the third lens, a curvature radius R3 of an object-side surface of the second lens and a curvature radius R4 of an image-side surface of the second lens may meet 1.4<(R5+R6)/(R3+R4)<2.1.

In an implementation mode, a center thickness CT1 of the first lens on the optical axis, a center thickness CT5 of the fifth lens on the optical axis and a center thickness CT6 of the sixth lens on the optical axis may meet 0.9<CT1/(CT5+CT6)<1.3.

In an implementation mode, a combined focal length f12 of the first lens and the second lens and a combined focal length f56 of the fifth lens and the sixth lens may meet 1.3<f12/f56<1.8.

In an implementation mode, SAG52 is an on-axis distance from an intersection point of an image-side surface of the fifth lens and the optical axis to an effective radius vertex of the image-side surface of the fifth lens, SAG51 is an on-axis distance from an intersection point of an object-side surface of the fifth lens and the optical axis to an effective radius vertex of the object-side surface of the fifth lens, and SAG52 and SAG51 may meet 1.2<SAG52/SAG51<1.8.

In an implementation mode, SAG62 is an on-axis distance from an intersection point of an image-side surface of the sixth lens and the optical axis to an effective radius vertex of the image-side surface of the sixth lens, SAG71 is an on-axis distance from an intersection point of an object-side surface of the seventh lens and the optical axis to an effective radius vertex of the object-side surface of the seventh lens, and a spacing distance T67 of the sixth lens and the seventh lens on the optical axis, SAG62 and SAG71 may meet 1.8<T67/(SAG62−SAG71)<2.8.

According to the disclosure, the seven lenses are combined with the variable diaphragm, the refractive power and surface types of each lens, the center thickness of each lens, on-axis distances between the lenses and the like are reasonably configured, and the arranged variable diaphragm has an adjustable clear aperture, so that the optical imaging lens assembly is endowed with at least one beneficial effect of small size, ultra-thin design, adjustable aperture, large image surface, high imaging quality, high structural and process performance, etc.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1A:
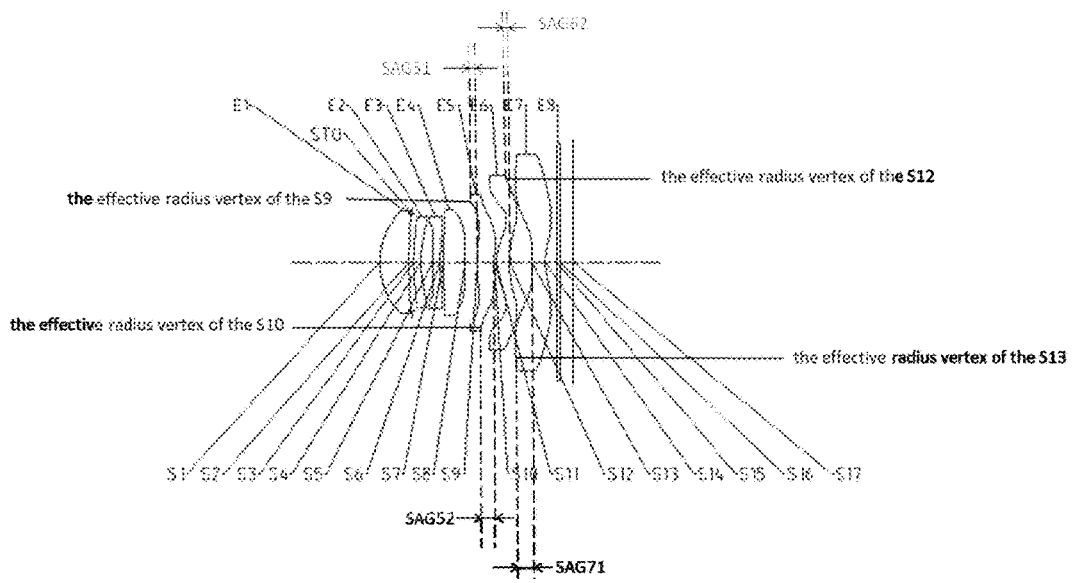
FIGS. 1A and 1B are structure diagrams of an optical imaging lens assembly in a maximum aperture state and a minimum aperture state according to embodiment 1 of the disclosure respectively.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles and other aspects of the disclosure will be described below in detail.

An optical imaging lens assembly according to an exemplary implementation mode of the disclosure may include, for example, seven lenses with refractive power respectively, i.e., a first lens, a second lens, a third lens, a fourth lens, a fifth lens, a sixth lens and a seventh lens. The seven lenses are sequentially arranged from an object side to an image side along an optical axis. There may be air spaces between any two adjacent lenses in the first lens to the seventh lens and between the lens and a diaphragm. In the exemplary implementation mode, the first lens may have a positive refractive power; the second lens may have a positive refractive power or a negative refractive power; the third lens may have a positive refractive power or a negative refractive power; the fourth lens may have a positive refractive power or a negative refractive power; the fifth lens may have a negative refractive power; the sixth lens may have a positive refractive power; and the seventh lens may have a negative positive power. The configuration of the positive and negative refractive power of each component of the lens assembly is controlled reasonably, so that the compactness of the optical imaging lens assembly may be ensured. Furthermore, the optical imaging lens assembly keeps transmitting light smoothly and stably and has the characteristics of large aperture and ultra-thin design, and the imaging quality of the optical imaging lens assembly may be improved effectively.

In an exemplary implementation mode, an object-side surface of the second lens may be a convex surface, while an image-side surface may be a concave surface. The surface types of the second lens may be set to enable the optical imaging lens assembly to converge light better and achieve an effect of increasing the aperture.

In an exemplary implementation mode, an object-side surface of the third lens may be a convex surface, while an image-side surface may be a concave surface. The surface types of the third lens may be set to enable the optical imaging lens assembly to further converge light and achieve an effect of enlarging the aperture.

In an exemplary implementation mode, the optical imaging lens assembly further includes a variable diaphragm. A clear aperture of the variable diaphragm is adjustable. Specifically, the variable diaphragm may be a blade moving variable diaphragm or a blade switching variable diaphragm. The variable diaphragm may be used to control an aperture value. The variable diaphragm may stay at a maximum clear aperture and a minimum clear aperture respectively, or may stay at a position therebetween.

In an exemplary implementation mode, the optical imaging lens assembly of the disclosure includes a variable diaphragm. The optical imaging lens assembly may meet $3.0<f/(EPDmax-EPDmin)<6.0$, wherein EPDmax is a maximum entrance pupil diameter of the optical imaging lens assembly, EPDmin is a minimum entrance pupil diameter of the optical imaging lens assembly, and f is a total effective focal length of the optical imaging lens assembly. The optical imaging lens assembly meets $3.0<f/(EPDmax-EPDmin)<6.0$, so that a variation range of the aperture thereof may further be widened. The aperture may be adjusted for different shooting scenes when the optical imaging lens assembly is used for shooting. An image shot by the optical imaging lens assembly is more layered. More specifically, f, EPDmin and EPDmax may meet $4.40<f/(EPDmax-EPDmin)<4.55$.

In an exemplary implementation mode, the optical imaging lens assembly of the disclosure may meet $1.2<f1/EPDmax<1.8$, where f1 is an effective focal length of the first lens, and EPDmax is a maximum entrance pupil diameter of the optical imaging lens assembly. The optical imaging lens assembly meets $1.2<f1/EPDmax<1.8$, so that a luminous flux thereof in a large aperture state may be increased, and the image quality is further improved. More specifically, f1 and EPDmax may further meet $1.40<f1/EPDmax<1.70$.

In an exemplary implementation mode, the optical imaging lens assembly provided in the disclosure may meet $7 < f/\Delta DT < 9$, wherein f is a total effective focal length of the optical imaging lens assembly, and $\Delta DT$ is a maximum variation of a clear aperture of the variable diaphragm. The optical imaging lens assembly meets $7 < f/\Delta DT < 9$, so that an aperture rang is widened favorably, and it may be ensured that the optical imaging lens assembly has a relatively wide variable aperture range to achieve a better shooting effect in an aperture variation process. More specifically, f and IDT may meet $8.42 < f/\Delta DT < 8.78$.

In an exemplary implementation mode, the optical imaging lens assembly of the disclosure may meet $0.5 < (f2+f5)/f3 < 1.5$, wherein f2 is an effective focal length of the second lens, f5 is an effective focal length of the fifth lens, and f3 is an effective focal length of the third lens. The optical imaging lens assembly meets $0.5 < (f2+f5)/f3 < 1.5$, which is favorable for optimizing a spherical aberration. More specifically, f2, f5 and f3 may meet $0.70 < (f2+f5)/f3 < 1.25$.

In an exemplary implementation mode, the optical imaging lens assembly provided in the disclosure may meet $0.3 < (R14-R13)/f7 < 2.1$, wherein R14 is a curvature radius of an image-side surface of the seventh lens, R13 is a curvature radius of an object-side surface of the seventh lens, and f7 is an effective focal length of the seventh lens. Meeting $0.3 < (R14-R13)/f7 < 2.1$ is favorable for optimizing a lens shape of the seventh lens. More specifically, R14, R13 and f7 may further meet $0.35 < (R14-R13)/f7 < 2.10$.

In an exemplary implementation mode, the optical imaging lens assembly provided in the disclosure may meet $1.4 < (R5+R6)/(R3+R4) < 2.1$, wherein R5 is a curvature radius of an object-side surface of the third lens, R6 is a curvature radius of an image-side surface of the third lens, R3 is a curvature radius of an object-side surface of the second lens, and R4 is a curvature radius of an image-side surface of the second lens. The optical imaging lens assembly meets $1.4 < (R5+R6)/(R3+R4) < 2.1$, so that the synchronous optimization of lens shapes of the second lens and the third lens is facilitated, and a spherical aberration and chromatic aberration of the optical imaging lens assembly may be corrected. More specifically, R5, R6, R3 and R4 may meet $1.45 < (R5+R6)/(R3+R4) < 1.87$.

In an exemplary implementation mode, the optical imaging lens assembly provided in the disclosure may meet $0.9 < CT1/(CT5+CT6) < 1.3$, wherein CT1 is a center thickness of the first lens on the optical axis, CT5 is a center thickness of the fifth lens on the optical axis, and CT6 is a center thickness of the sixth lens on the optical axis. The optical imaging lens assembly meets $0.9 < CT1/(CT5+CT6) < 1.3$, so that the optimization of the spherical aberration of the optical imaging lens assembly is facilitated, and a distortion of the optical imaging lens assembly may be improved to a certain extent. More specifically, CT1, CT5 and CT6 may meet $0.92 < CT1/(CT5+CT6) < 1.02$.

In an exemplary implementation mode, the optical imaging lens assembly provided in the disclosure may meet $1.3 < f12/f56 < 1.8$, wherein f12 is a combined focal length of the first lens and the second lens, and f56 is a combined focal length of the fifth lens and the sixth lens. Meeting $1.3 < f12/f56 < 1.8$ is favorable for optimizing the aberration of the optical imaging lens assembly and may improve the structural and process performance of the optical imaging lens assembly. Specifically, f12 and f56 may meet $1.30 < f12/f56 < 1.73$.

In an exemplary implementation mode, the optical imaging lens assembly provided in the disclosure may meet $1.2 < SAG52/SAG51 < 1.8$, wherein SAG52 is an on-axis distance from an intersection point of an image-side surface of the fifth lens and the optical axis to an effective radius vertex of the image-side surface of the fifth lens, and SAG51 is an on-axis distance from an intersection point of an object-side surface of the fifth lens and the optical axis to an effective radius vertex of the object-side surface of the fifth lens. The optical imaging lens assembly meets $1.2 < SAG52/SAG51 < 1.8$, so that the optimization of a lens shape and process performance of the fifth lens is facilitated, the astigmatism of the optical imaging lens assembly may be improved, and intensities of ghost images generated by reflection by the fifth lens and the third lens may be reduced.

In an exemplary implementation mode, the optical imaging lens assembly provided in the disclosure may meet $1.8 < T67/(SAG62-SAG71) < 2.8$, wherein T67 is a spacing distance of the sixth lens and the seventh lens on the optical axis, SAG62 is an on-axis distance from an intersection point of an image-side surface of the sixth lens and the optical axis to an effective radius vertex of the image-side surface of the sixth lens, and SAG71 is an on-axis distance from an intersection point of an object-side surface of the seventh lens and the optical axis to an effective radius vertex of the object-side surface of the seventh lens. Meeting $1.8 < T67/(SAG62-SAG71) < 2.8$ is favorable for optimizing lens shapes of the sixth lens and the seventh lens to optimize a field curvature of the optical imaging lens assembly and may optimize ghost images generated by reflection between the sixth lens, the seventh lens and the other lenses. More specifically, T67, SAG62 and SAG71 may meet $1.90 < T67/(SAG62-SAG71) < 2.80$.

In an exemplary implementation mode, the optical imaging lens assembly may further include an optical filter configured to correct a chromatic aberration and/or protective glass configured to protect a photosensitive element on the imaging surface.

The optical imaging lens assembly according to the implementation mode of the disclosure may adopt seven lenses, for example, the above-mentioned seven. The disclosure provides an optical imaging lens assembly which is small and aperture-adjustable. The refractive power and surface types of each lens, the center thickness of each lens, on-axis distances between the lenses and the like are reasonably configured to effectively reduce the size of the optical imaging system, reduce the sensitivity of the optical imaging system and improve the machinability of the camera lens group such that the optical imaging system is more favorable for production and machining and applicable to a portable electronic product. In addition, the optical imaging lens assembly of the disclosure also has the beneficial effects of adjustable aperture, large image surface, high structural and process performance, etc. Moreover, a double-aperture design solution is added, so that the aperture of the optical imaging lens assembly is adjustable, and the aperture may further be adjusted according to different shooting scenes when in use to make a shot image more layered.

In the implementation mode of the disclosure, at least one of mirror surfaces of each lens is an aspheric mirror surface, namely at least one of the object-side surface of the first lens to an image-side surface of the seventh lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. Optionally, at least one of the object-side surface and image-side surface of each lens in the first lens, the second lens, the third lens, the fourth lens, the fifth lens, the sixth lens and the seventh lens is an aspheric mirror surface. Optionally, both the object-side surface and image-side surface of each lens in the first lens, the second lens, the third lens, the fourth lens, the fifth lens, the sixth lens and the seventh lens are aspheric mirror surfaces.

However, those skilled in the art should know that the number of the lenses forming the optical imaging lens assembly may be changed without departing from the technical solutions claimed in the disclosure to achieve each result and advantage described in the specification. For example, although descriptions are made in the implementation with seven lenses as an example, the optical imaging lens assembly is not limited to seven lenses. If necessary, the optical imaging lens assembly may further include another number of lenses.

Specific embodiments applied to the optical imaging lens assembly of the above-mentioned implementation mode will further be described below with reference to the drawings.

Embodiment 1

Figure 1B:
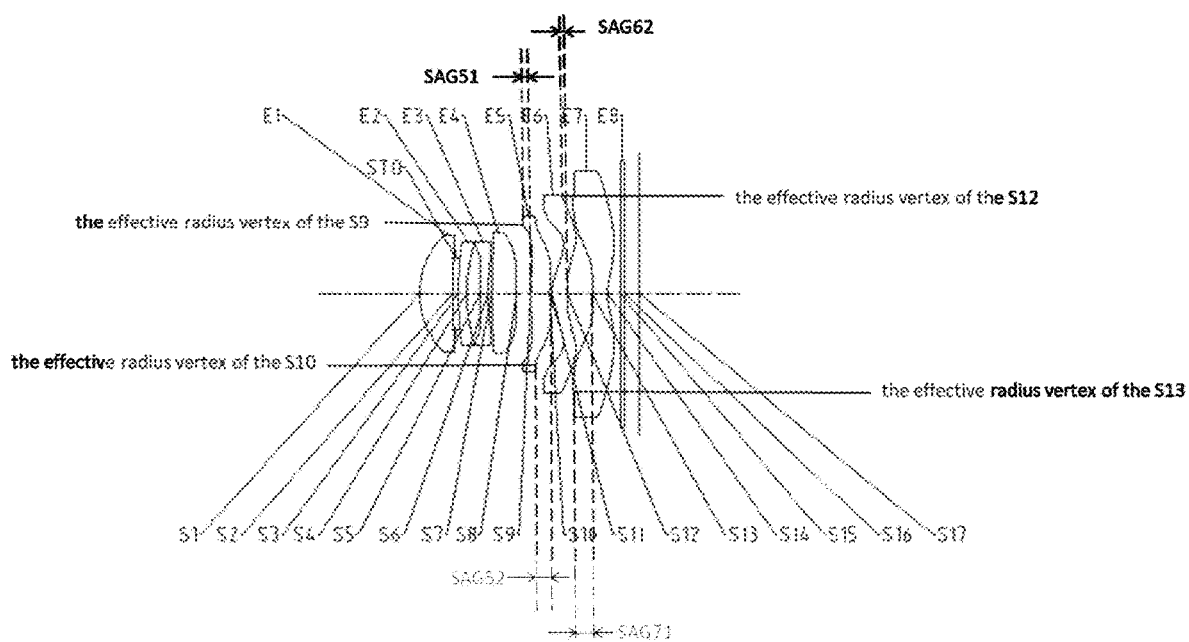

An optical imaging lens assembly according to embodiment 1 of the disclosure will be described below with reference to FIGS. 1A to 3C. FIGS. 1A and 1B are a structure diagrams of an optical imaging lens assembly according to embodiment 1 of the disclosure.

As shown in FIG. 1A, the optical imaging lens assembly sequentially includes, from an object side to an image side along an optical axis, a first lens E1, a diaphragm STO, a second lens E2, a third lens E3, a fourth lens E4, a fifth lens E5, a sixth lens E6, a seventh lens E7, and an optical filter E8.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

Table 1 shows a basic parameter table of the optical imaging lens assembly of embodiment 1, and units of the curvature radius, the thickness and the focal length are all millimeter (mm).

TABLE 1

| Surface number | Surface type | Curvature radius | Thickness | Refractive index | Abbe number | Focal length | Conic coefficient |
|---|---|---|---|---|---|---|---|
| OBJ | Spherical | Infinite | Infinite | | | | |
| S1 | Aspheric | 2.5315 | 0.9809 | 1.55 | 56.1 | 5.78 | 0.1151 |
| S2 | Aspheric | 11.0345 | 0.0940 | | | | 19.5881 |
| STO | Spherical | Infinite | 0.0691 | | | | |
| S3 | Aspheric | 4.9492 | 0.2608 | 1.68 | 19.2 | −16.07 | 3.3359 |
| S4 | Aspheric | 3.3301 | 0.4002 | | | | 0.6543 |
| S5 | Aspheric | 8.1928 | 0.2500 | 1.68 | 19.2 | −25.15 | 6.1429 |
| S6 | Aspheric | 5.4645 | 0.1074 | | | | −1.0000 |
| S7 | Aspheric | 12.2306 | 0.7380 | 1.57 | 37.3 | 22.81 | −4.2837 |
| S8 | Aspheric | 200.1385 | 0.4171 | | | | 0.0000 |
| S9 | Aspheric | 8.2767 | 0.5668 | 1.55 | 56.1 | −6.49 | 0.0000 |
| S10 | Aspheric | 2.4210 | 0.0623 | | | | −0.7296 |
| S11 | Aspheric | 1.3638 | 0.4614 | 1.55 | 56.1 | 2.65 | −1.0000 |
| S12 | Aspheric | 21.1041 | 0.7428 | | | | −1.0000 |
| S13 | Aspheric | 9.7762 | 0.4550 | 1.55 | 56.1 | −3.91 | −0.2322 |
| S14 | Aspheric | 1.7230 | 0.3806 | | | | −1.0762 |
| S15 | Spherical | Infinite | 0.1100 | 1.52 | 64.2 | | |
| S16 | Spherical | Infinite | 0.4533 | | | | |
| S17 | Spherical | Infinite | | | | | |

In embodiment 1, a value of a total effective focal length f of the optical imaging lens assembly is 4.89 mm. FNOmin is a minimum value of an F-number of the optical imaging lens assembly, and a value of FNOmin is 1.40. FNOmax is a maximum value of the F-number of the optical imaging lens assembly, and a value of FNOmax is 2.04. TTL is an on-axis distance from the object-side surface S1 of the first lens E1 to the imaging surface S17, and a value of TTL is 6.55 mm. ImgH is a half of a diagonal length of an effective pixel region on the imaging surface S17, and a value of lrngH is 4.20 mm.

In embodiment 1, both the object-side surface and image-side surface of any lens in the first lens E1 to the seventh lens E7 are aspheric surfaces, and a surface type x of each aspheric lens may be defined through, but not limited to, the following aspheric surface formula:

$$x = \frac{ch^2}{1+\sqrt{1-(k+1)c^2h^2}} + \sum A_i h^i, \quad (1)$$

wherein x is a distance vector height of a distance between the aspheric surface and a vertex of the aspheric surface when the aspheric surface is located at a position with the height h along the optical axis direction, c=1/R (namely, the paraxial curvature c is a reciprocal of the curvature radius R in Table 1 above); k is a conic coefficient; and Ai is a correction coefficient of the i-th order of the aspheric surface. Table 2 shows high-order coefficients A4, A6, A8, A10, A12, A14, A16, A18, A20, A22, A24, A26, A28 and A30 that can be used for each of the aspheric mirror surfaces S1-S14 in embodiment 1.

TABLE 2

| Surface number | A4 | A6 | A8 | A10 | A12 | A14 | A16 |
|---|---|---|---|---|---|---|---|
| S1 | −2.3077E−03 | 1.5605E−02 | −6.9305E−02 | 1.9195E−01 | −3.4698E−01 | 4.2581E−01 | −3.6334E−01 |
| S2 | −3.0568E−02 | −1.0785E−03 | 1.3009E−01 | −4.4207E−01 | 8.8441E−01 | −1.1847E+00 | 1.1024E+00 |
| S3 | −8.5808E−02 | 7.3190E−02 | −1.1491E−01 | 2.4462E−01 | −3.0681E−01 | 2.9060E−02 | 5.4920E−01 |
| S4 | −6.4603E−02 | 1.6559E−02 | 1.1992E−01 | −4.9870E−01 | 1.2021E+00 | −1.9287E+00 | 2.1016E+00 |
| S5 | −4.3484E−02 | 2.6950E−02 | −1.0277E−01 | 1.7039E−01 | −1.8746E−01 | 1.1991E−01 | −2.8423E−02 |
| S6 | −4.1332E−02 | 5.1238E−02 | −8.5163E−02 | 9.2230E−02 | −6.9222E−02 | 3.8514E−02 | −2.0233E−02 |
| S7 | −4.6789E−02 | 9.2993E−02 | −2.3522E−01 | 5.1687E−01 | −8.0044E−01 | 8.6202E−01 | −6.4588E−01 |
| S8 | −3.9496E−02 | −5.2867E−02 | 3.4619E−01 | −1.1041E+00 | 2.2167E+00 | −3.0362E+00 | 2.9431E+00 |
| S9 | −5.1238E−02 | 6.9190E−02 | −1.1201E−01 | 1.9394E−01 | −3.0125E−01 | 3.4494E−01 | −2.7883E−01 |
| S10 | −3.8298E−01 | 2.6451E−01 | −7.2557E−02 | −9.2250E−02 | 1.5822E−01 | −1.3408E−01 | 7.6691E−02 |
| S11 | −1.9509E−01 | 1.6782E−01 | −1.2174E−01 | 1.7494E−02 | 5.0241E−02 | −5.2925E−02 | 2.8550E−02 |
| S12 | 1.8016E−01 | −6.3046E−02 | −1.0226E−01 | 1.4220E−01 | −9.3221E−02 | 3.9070E−02 | −1.1333E−02 |
| S13 | −1.8487E−01 | 8.8756E−02 | −3.6125E−02 | 1.2279E−02 | −1.6448E−03 | −6.5845E−04 | 3.9999E−04 |
| S14 | −2.1160E−01 | 1.2378E−01 | −6.1995E−02 | 2.4070E−02 | −6.8517E−03 | 1.3967E−03 | −2.0086E−04 |

| Surface number | A18 | A20 | A22 | A24 | A26 | A28 | A30 |
|---|---|---|---|---|---|---|---|
| S1 | 2.1778E−01 | −9.1343E−02 | 2.6243E−02 | −4.9197E−03 | 5.4200E−04 | −2.6611E−05 | 0.0000E+00 |
| S2 | −7.2145E−01 | 3.3082E−01 | −1.0403E−01 | 2.1361E−02 | −2.5789E−03 | 1.3878E−04 | 0.0000E+00 |
| S3 | −9.6751E−01 | 9.0193E−01 | −5.3158E−01 | 2.0452E−01 | −5.0031E−02 | 7.0877E−03 | −4.4373E−04 |
| S4 | −1.5547E+00 | 7.6685E−01 | −2.4088E−01 | 4.3478E−02 | −3.4222E−03 | 0.0000E+00 | 0.0000E+00 |
| S5 | −1.5430E−02 | 1.4384E−02 | −4.4676E−03 | 5.2184E−04 | 0.0000E+00 | 0.0000E+00 | 0.0000E+00 |
| S6 | 1.1102E−02 | −4.6782E−03 | 1.1223E−03 | −1.1105E−04 | 0.0000E+00 | 0.0000E+00 | 0.0000E+00 |
| S7 | 3.3291E−01 | −1.1500E−01 | 2.5280E−02 | −3.1774E−03 | 1.7274E−04 | 0.0000E+00 | 0.0000E+00 |
| S8 | −2.0533E+00 | 1.0346E+00 | −3.7290E−01 | 9.3697E−02 | −1.5578E−02 | 1.5391E−03 | −6.8370E−05 |
| S9 | 1.5943E−01 | −6.4731E−02 | 1.8543E−02 | −3.6628E−03 | 4.7447E−04 | −3.6247E−05 | 1.2366E−06 |
| S10 | −3.1531E−02 | 9.4326E−03 | −2.0305E−03 | 3.0528E−04 | −3.0318E−05 | 1.7821E−06 | −4.6856E−08 |
| S11 | −9.9757E−03 | 2.4021E−03 | −4.0379E−04 | 4.6631E−05 | −3.5276E−06 | 1.5741E−07 | −3.1401E−09 |
| S12 | 2.3433E−03 | −3.4789E−04 | 3.6753E−05 | −2.6897E−06 | 1.2917E−07 | −3.6446E−09 | 4.5517E−11 |
| S13 | −1.0313E−04 | 1.6298E−05 | −1.7045E−06 | 1.1907E−07 | −5.3671E−09 | 1.4166E−10 | −1.6667E−12 |
| S14 | 1.9897E−05 | −1.2835E−06 | 4.5396E−08 | −1.0394E−10 | −6.3517E−11 | 2.4801E−12 | −3.2068E−14 |

Figure 2A:
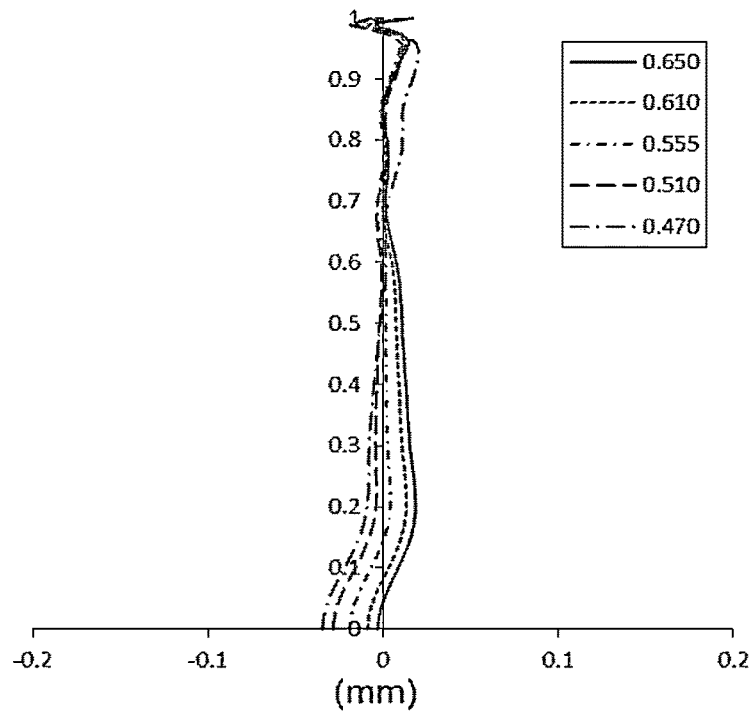
FIGS. 2A to 2C show a longitudinal aberration curve, an astigmatism curve and a distortion curve of an optical imaging lens assembly under a maximum F-number according to embodiment 1 respectively.
Figure 2B:
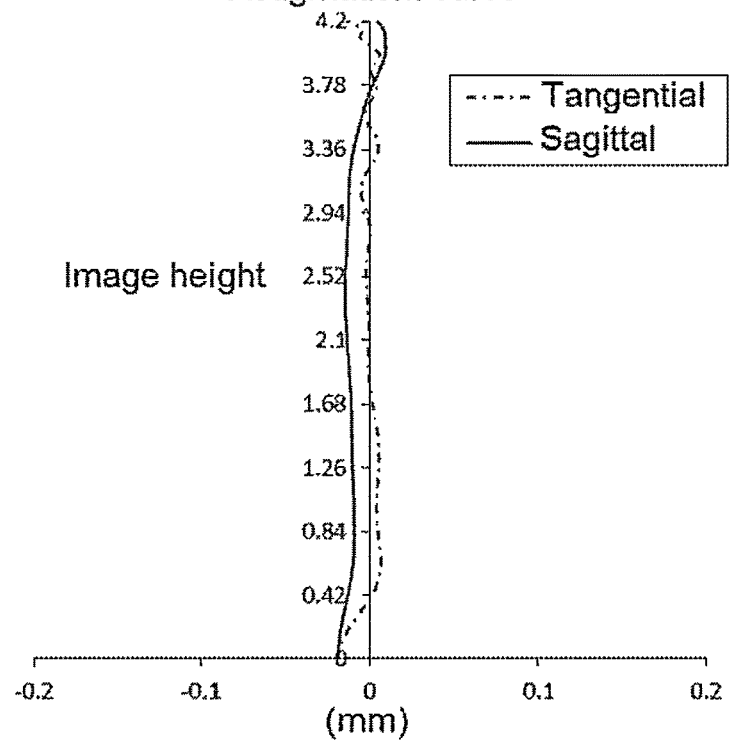
Figure 2C:
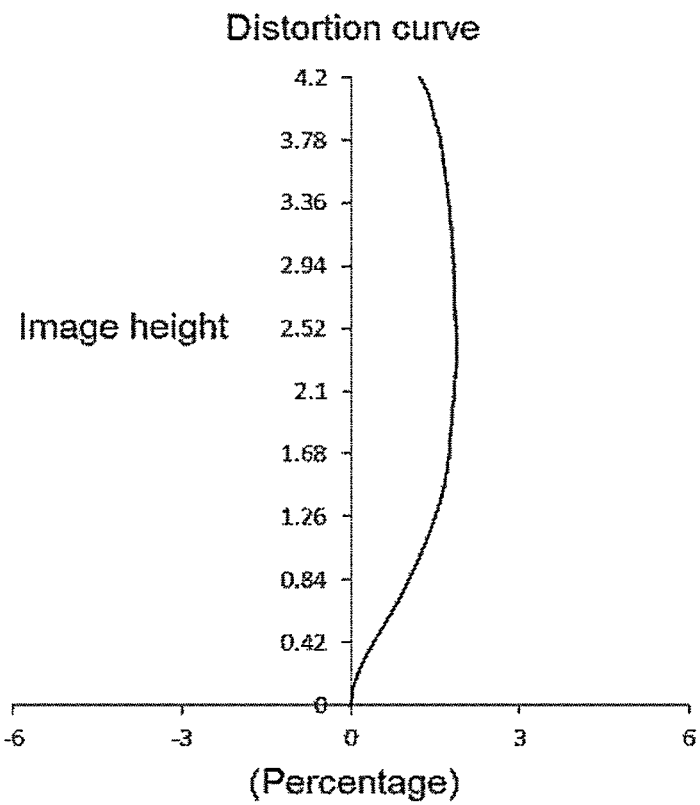
Figure 3A:
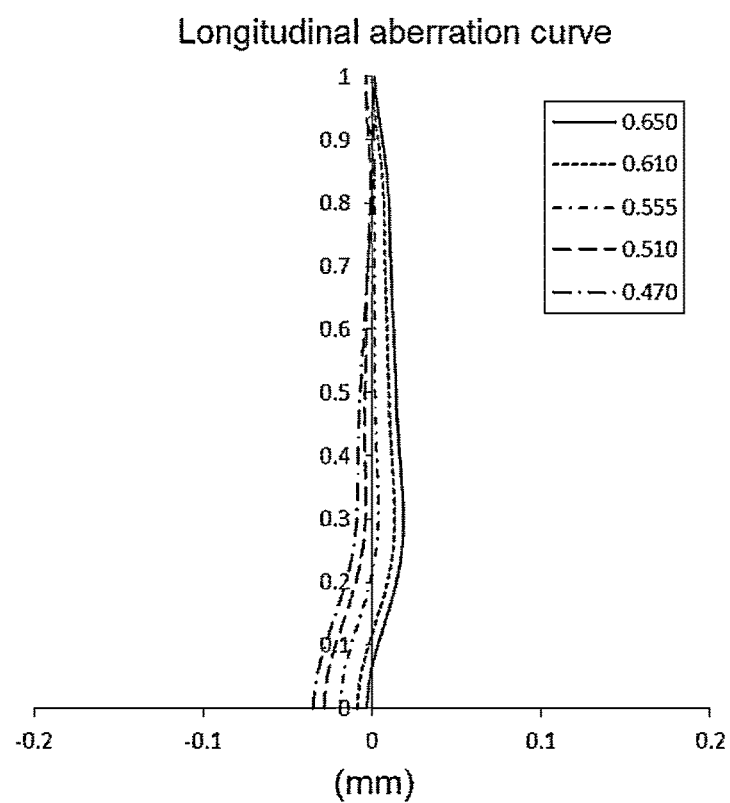
FIGS. 3A to 3C show a longitudinal aberration curve, an astigmatism curve and a distortion curve of an optical imaging lens assembly under a minimum F-number according to embodiment 1 respectively.
Figure 3B:
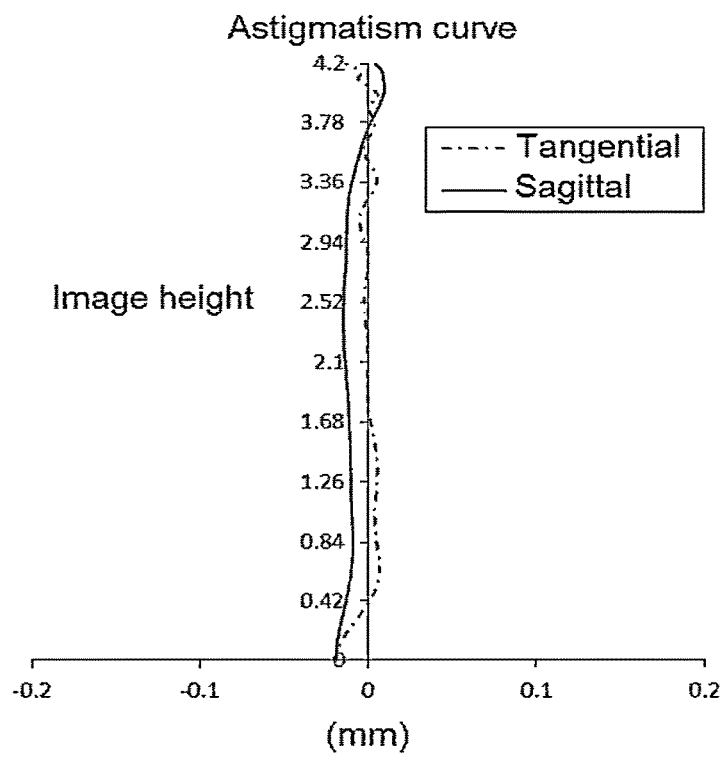
Figure 3C:
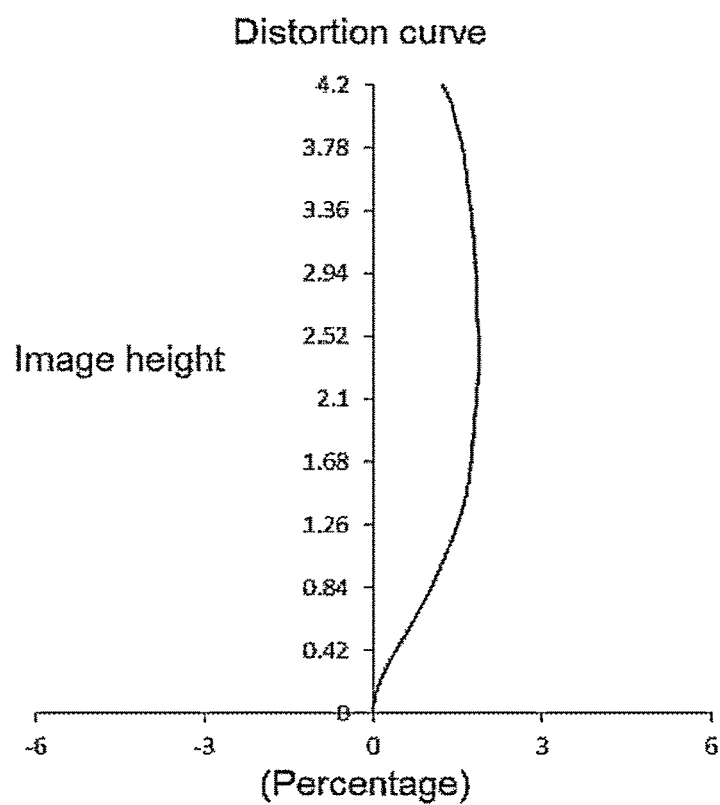

FIG. 2A shows a longitudinal aberration curve of the optical imaging lens assembly according to embodiment 1 under a minimum F-number to represent deviation of a convergence focal point after light with different wavelengths passes through the lens assembly. FIG. 2B shows an astigmatism curve of the optical imaging lens assembly according to embodiment 1 under a minimum F-number to represent a tangential image surface curvature and a sagittal image surface curvature. FIG. 2C shows a distortion curve of the optical imaging lens assembly according to embodiment 1 under a minimum F-number to represent distortion values corresponding to different fields of view. FIG. 3A shows a longitudinal aberration curve of the optical imaging lens assembly according to embodiment 1 under a maximum F-number to represent deviation of a convergence focal point after light with different wavelengths passes through the lens assembly. FIG. 3B shows an astigmatism curve of the optical imaging lens assembly according to embodiment 1 under a maximum F-number to represent a tangential image surface curvature and a sagittal image surface curvature. FIG. 3C shows a distortion curve of the optical imaging lens assembly according to embodiment 1 under a maximum F-number to represent distortion values corresponding to different fields of view. According to FIGS. 2A to 3C, it can be seen that the optical imaging lens assembly provided in embodiment 1 may achieve high imaging quality.

Embodiment 2

Figure 4A:
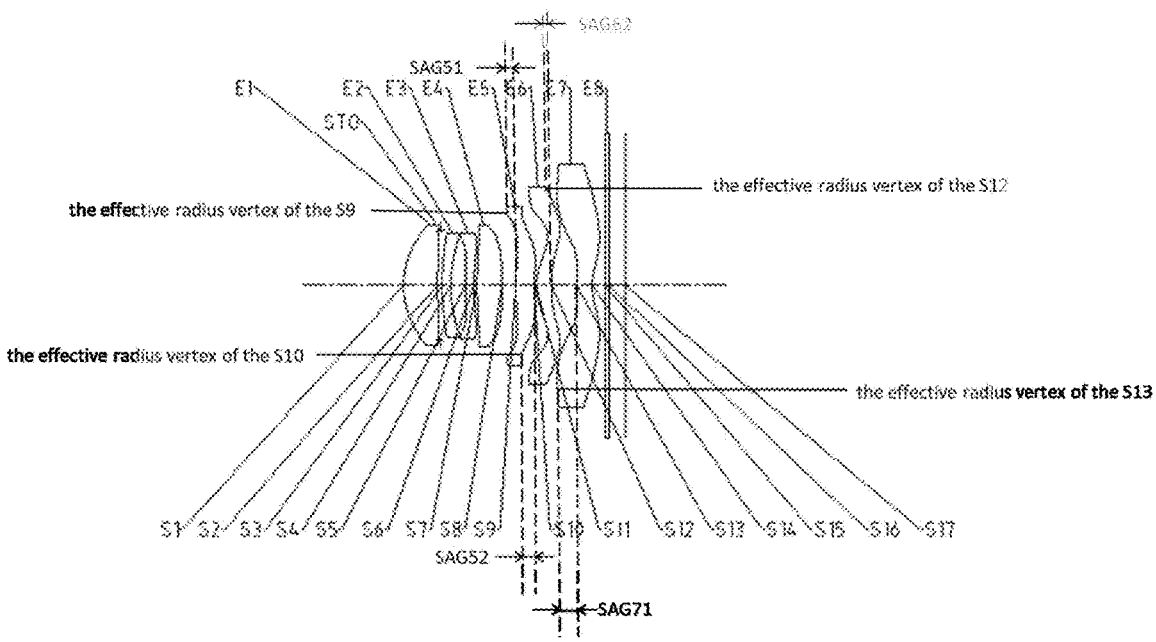
FIGS. 4A and 4B are a structure diagrams of an optical imaging lens assembly according to embodiment 2 of the disclosure respectively.
Figure 4B:
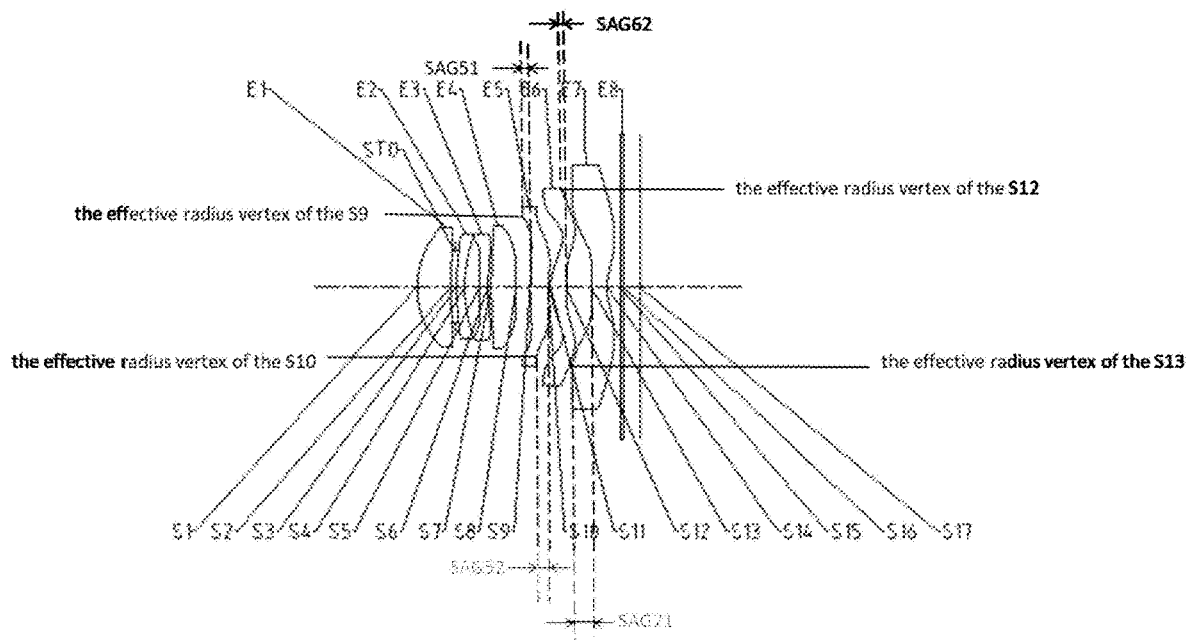

An optical imaging lens assembly according to embodiment 2 of the disclosure will be described below with reference to FIGS. 4A to 6C. In the embodiment and the following embodiments, part of descriptions similar to those about embodiment 1 are omitted for simplicity. FIGS. 4A and 4B are a structure diagrams of an optical imaging lens assembly according to embodiment 2 of the disclosure.

As shown in FIG. 4A, the optical imaging lens assembly sequentially includes, from an object side to an image side along an optical axis, a first lens E1, a diaphragm STO, a second lens E2, a third lens E3, a fourth lens E4, a fifth lens E5, a sixth lens E6, a seventh lens E7, and an optical filter E8.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In embodiment 2, a value of a total effective focal length f of the optical imaging lens assembly is 4.90 mm. FNOmin is a minimum value of an F-number of the optical imaging lens assembly, and a value of FNOmin is 1.40. FNOmax is a maximum value of the F-number of the optical imaging lens assembly, and a value of FNOmax is 2.04. TTL is an on-axis distance from the object-side surface S1 of the first lens E1 to the imaging surface S17, and a value of TTL is 6.55 mm. ImgH is a half of a diagonal length of an effective pixel region on the imaging surface S17, and a value of ImgH is 4.20 mm.

Table 3 shows a basic parameter table of the optical imaging lens assembly of embodiment 2, and units of the curvature radius, the thickness and the focal length are all millimeter (mm). Table 4 shows high-order coefficients that can be used for each aspheric mirror surface in embodiment 2. A surface type of each aspheric surface may be defined by the formula (1) given in embodiment 1.

TABLE 3

| Surface number | Surface type | Curvature radius | Thickness | Refractive index | Abbe number | Focal length | Conic coefficient |
|---|---|---|---|---|---|---|---|
| OBJ | Spherical | Infinite | Infinite | | | | |
| S1 | Aspheric | 2.5821 | 0.9969 | 1.55 | 56.1 | 5.76 | 0.0784 |
| S2 | Aspheric | 12.4963 | 0.1053 | | | | 17.5035 |
| STO | Spherical | Infinite | 0.0447 | | | | |
| S3 | Aspheric | 4.4669 | 0.2566 | 1.68 | 19.2 | −14.99 | 2.4154 |
| S4 | Aspheric | 3.0303 | 0.4422 | | | | 0.3616 |
| S5 | Aspheric | 8.4836 | 0.2500 | 1.68 | 19.2 | −22.11 | 1.2130 |
| S6 | Aspheric | 5.3521 | 0.0920 | | | | −15.9333 |
| S7 | Aspheric | 11.1887 | 0.7334 | 1.57 | 37.3 | 17.28 | −1.0000 |
| S8 | Aspheric | −80.7622 | 0.4052 | | | | 0.0000 |
| S9 | Aspheric | 7.5404 | 0.5371 | 1.55 | 56.1 | −7.29 | 0.0000 |
| S10 | Aspheric | 2.5388 | 0.0635 | | | | −4.4935 |
| S11 | Aspheric | 1.4432 | 0.4568 | 1.55 | 56.1 | 2.95 | −1.0000 |
| S12 | Aspheric | 12.5208 | 0.7423 | | | | −1.0000 |
| S13 | Aspheric | 4.3945 | 0.4550 | 1.55 | 56.1 | −4.25 | −26.2748 |
| S14 | Aspheric | 1.4629 | 0.3931 | | | | −1.1296 |
| S15 | Spherical | Infinite | 0.1100 | 1.52 | 64.2 | | |
| S16 | Spherical | Infinite | 0.4659 | | | | |
| S17 | Spherical | Infinite | | | | | |

TABLE 4

| Surface number | A4 | A6 | A8 | A10 | A12 | A14 | A16 |
|---|---|---|---|---|---|---|---|
| S1 | −4.8109E−04 | −1.1516E−03 | 9.0145E−03 | −3.2010E−02 | 6.7949E−02 | −9.3952E−02 | 8.7830E−02 |
| S2 | −3.4083E−02 | 1.2076E−02 | 9.7157E−02 | −3.7227E−01 | 7.6911E−01 | −1.0408E+00 | 9.6774E−01 |
| S3 | −8.8941E−02 | 5.8348E−02 | 1.9600E−02 | −2.9247E−01 | 1.0182E+00 | −2.1670E+00 | 3.0808E+00 |
| S4 | −6.5756E−02 | 1.1387E−02 | 1.5293E−01 | −5.9063E−01 | 1.3357E+00 | −2.0114E+00 | 2.0612E+00 |
| S5 | −4.6353E−02 | 3.2881E−02 | −1.3800E−01 | 2.9434E−01 | −4.3692E−01 | 4.3642E−01 | −2.8905E−01 |
| S6 | −2.9654E−02 | 2.2875E−02 | −9.1143E−03 | −5.1942E−02 | 1.2015E−01 | −1.3506E−01 | 9.0658E−02 |
| S7 | −3.9489E−02 | 7.1414E−02 | −1.7738E−01 | 3.9825E−01 | −6.2546E−01 | 6.7585E−01 | −5.0496E−01 |
| S8 | −3.2324E−02 | −8.9812E−02 | 4.7446E−01 | −1.4071E+00 | 2.7219E+00 | −3.6416E+00 | 3.4703E+00 |
| S9 | −4.5487E−02 | 4.3031E−02 | −6.2513E−02 | 1.2612E−01 | −2.2399E−01 | 2.7165E−01 | −2.2395E−01 |
| S10 | −2.6364E−01 | 8.4375E−02 | 1.4608E−01 | −2.7620E−01 | 2.6299E−01 | −1.7192E−01 | 8.2910E−02 |
| S11 | −1.3068E−01 | 3.8739E−02 | 5.1095E−02 | −1.4492E−01 | 1.6654E−01 | −1.1803E−01 | 5.6603E−02 |
| S12 | 1.4584E−01 | −2.2106E−02 | −1.4240E−01 | 1.8066E−01 | −1.2182E−01 | 5.3775E−02 | −1.6553E−02 |
| S13 | −1.9734E−01 | 8.5162E−02 | −1.9717E−02 | −4.6208E−03 | 8.3797E−03 | −4.5816E−03 | 1.4686E−03 |
| S14 | −2.6225E−01 | 1.6492E−01 | −8.6344E−02 | 3.5035E−02 | −1.0651E−02 | 2.4016E−03 | −4.0092E−04 |

| Surface number | A18 | A20 | A22 | A24 | A26 | A28 | A30 |
|---|---|---|---|---|---|---|---|
| S1 | −5.6449E−02 | 2.4945E−02 | −7.4411E−03 | 1.4305E−03 | −1.5992E−04 | 7.8963E−06 | 0.0000E+00 |
| S2 | −6.2829E−01 | 2.8424E−01 | −8.7788E−02 | 1.7639E−02 | −2.0773E−03 | 1.0876E−04 | 0.0000E+00 |
| S3 | −3.0287E+00 | 2.0891E+00 | −1.0096E+00 | 3.3505E−01 | −7.2788E−02 | 9.3281E−03 | −5.3494E−04 |
| S4 | −1.4367E+00 | 6.6841E−01 | −1.9804E−01 | 3.3681E−02 | −2.4918E−03 | 0.0000E+00 | 0.0000E+00 |
| S5 | 1.2345E−01 | −3.1834E−02 | 4.2741E−03 | −1.9685E−04 | 0.0000E+00 | 0.0000E+00 | 0.0000E+00 |
| S6 | −3.7365E−02 | 9.1315E−03 | −1.1835E−03 | 5.9542E−05 | 0.0000E+00 | 0.0000E+00 | 0.0000E+00 |
| S7 | 2.5879E−01 | −8.8814E−02 | 1.9406E−02 | −2.4280E−03 | 1.3176E−04 | 0.0000E+00 | 0.0000E+00 |

TABLE 4-continued

| | | | | | | |
|---|---|---|---|---|---|---|
| S8 | −2.3880E+00 | 1.1888E+00 | −4.2370E−01 | 1.0533E−01 | −1.7330E−02 | 1.6947E−03 | −7.4523E−05 |
| S9 | 1.2842E−01 | −5.1882E−02 | 1.4736E−02 | −2.8822E−03 | 3.6965E−04 | −2.7975E−05 | 9.4625E−07 |
| S10 | −3.0142E−02 | 8.2534E−03 | −1.6709E−03 | 2.4111E−04 | −2.3309E−05 | 1.3459E−06 | −3.4953E−08 |
| S11 | −1.9065E−02 | 4.5698E−03 | −7.7584E−04 | 9.1122E−05 | −7.0358E−06 | 3.2105E−07 | −6.5563E−09 |
| S12 | 3.6434E−03 | −5.7707E−04 | 6.5202E−05 | −5.1214E−06 | 2.6530E−07 | −8.1337E−09 | 1.1153E−10 |
| S13 | −3.1062E−04 | 4.5218E−05 | −4.5764E−06 | 3.1738E−07 | −1.4417E−08 | 3.8701E−10 | −4.6597E−12 |
| S14 | 4.9496E−05 | −4.4988E−06 | 2.9745E−07 | −1.3951E−08 | 4.4182E−10 | −8.5209E−12 | 7.6080E−14 |

Figure 5A:
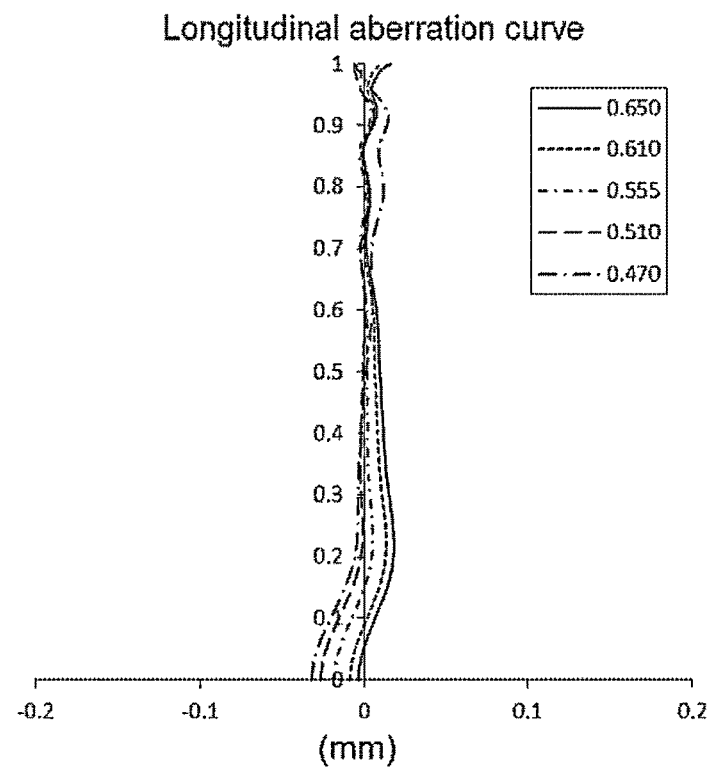
FIGS. 5A to 5C show a longitudinal aberration curve, an astigmatism curve and a distortion curve of an optical imaging lens assembly under a maximum F-number according to embodiment 2 respectively.
Figure 5B:
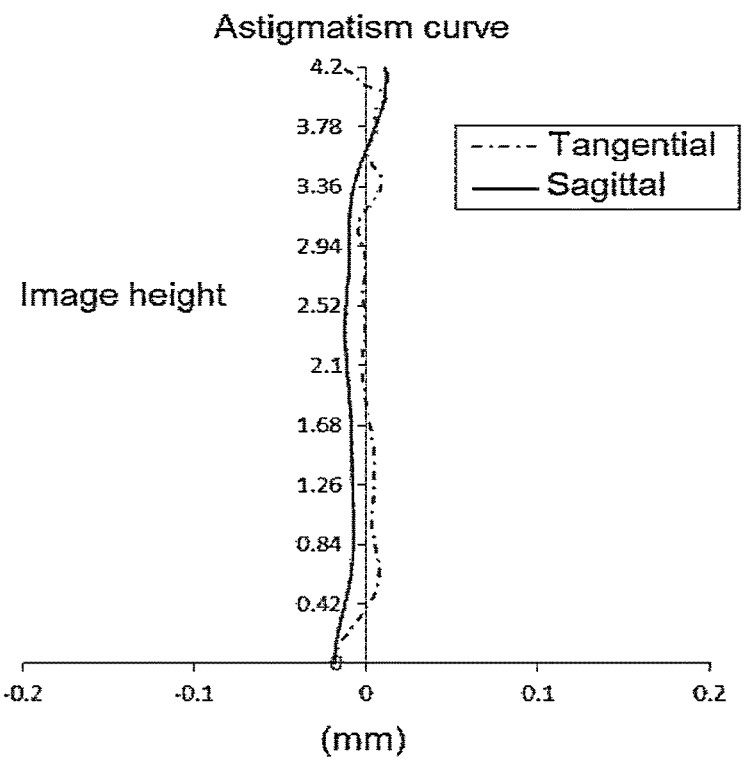
Figure 5C:
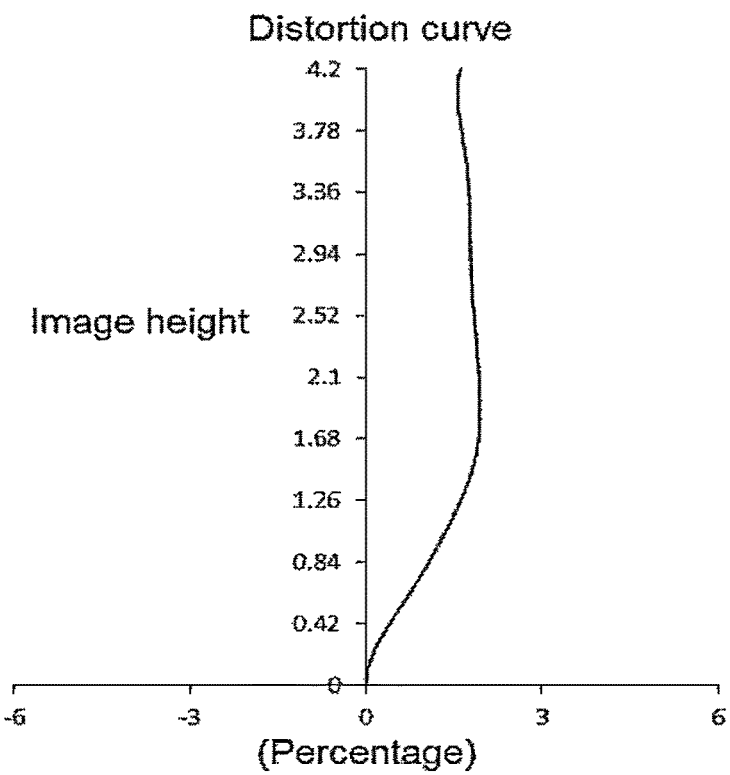
Figure 6A:
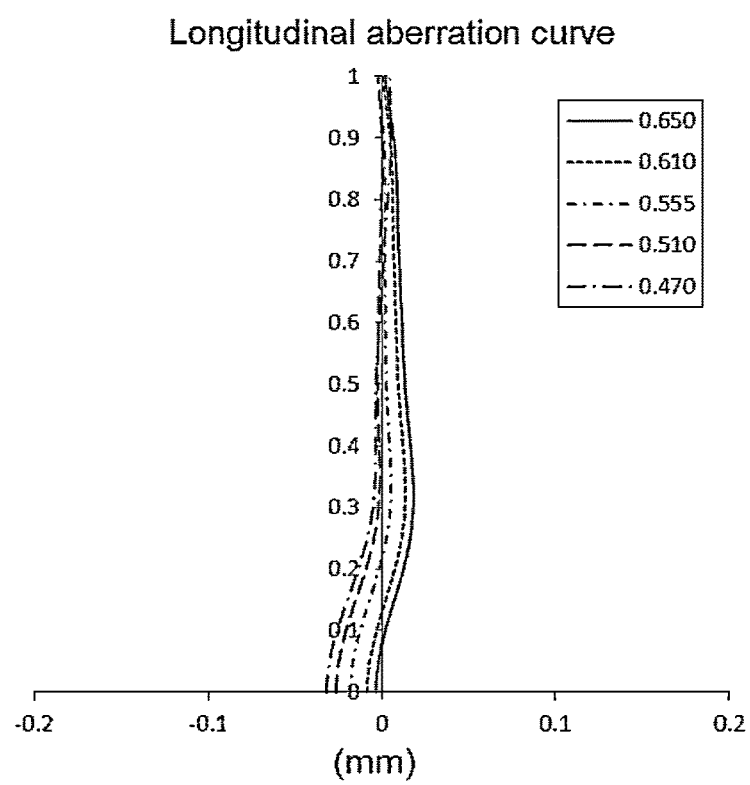
FIGS. 6A to 6C show a longitudinal aberration curve, an astigmatism curve and a distortion curve of an optical imaging lens assembly under a minimum F-number according to embodiment 2 respectively.
Figure 6B:
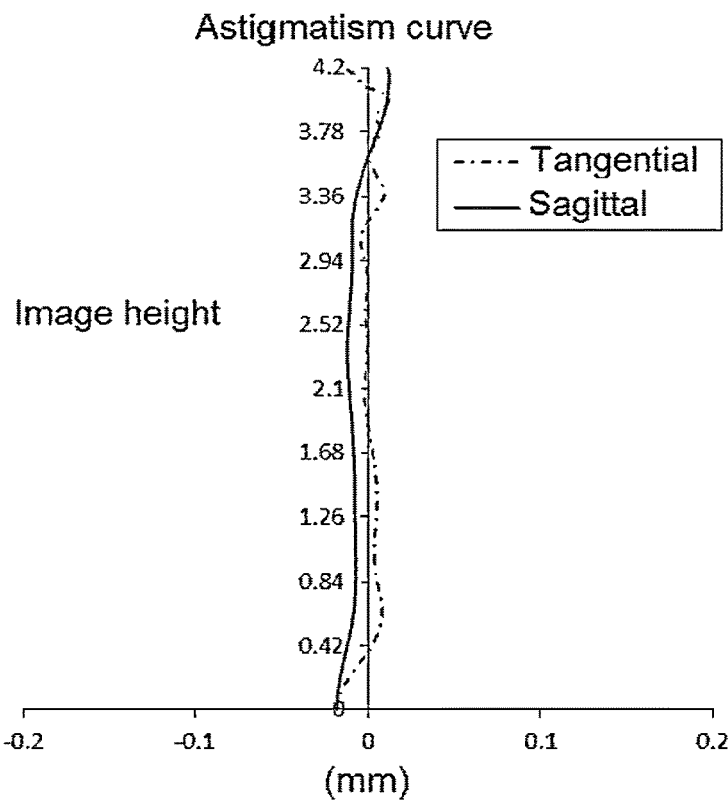
Figure 6C:
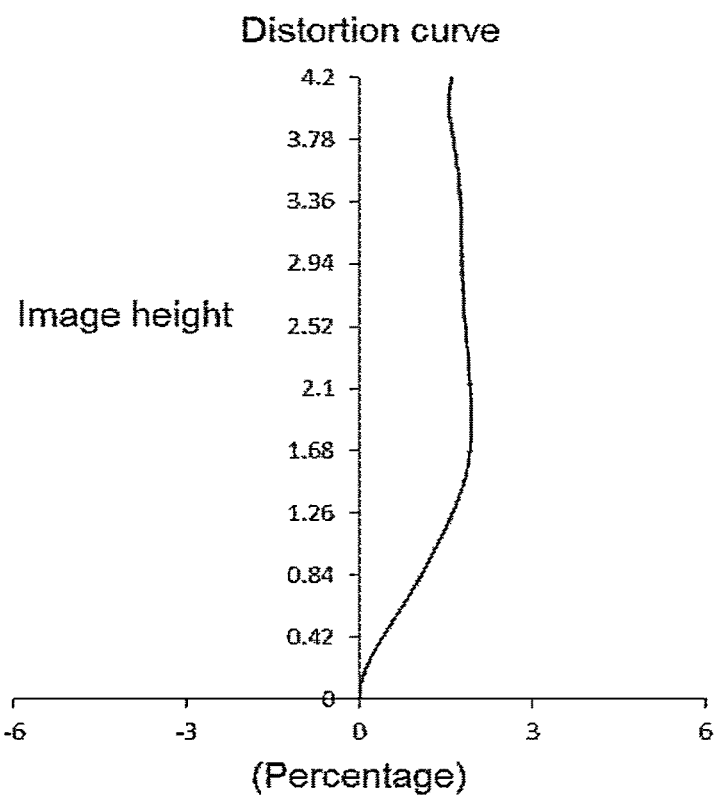

FIG. 5A shows a longitudinal aberration curve of the optical imaging lens assembly according to embodiment 2 under a minimum F-number to represent deviation of a convergence focal point after light with different wavelengths passes through the lens assembly. FIG. 5B shows an astigmatism curve of the optical imaging lens assembly according to embodiment 2 under a minimum F-number to represent a tangential image surface curvature and a sagittal image surface curvature. FIG. 5C shows a distortion curve of the optical imaging lens assembly according to embodiment 2 under a minimum F-number to represent distortion values corresponding to different fields of view. FIG. 6A shows a longitudinal aberration curve of the optical imaging lens assembly according to embodiment 2 under a maximum F-number to represent deviation of a convergence focal point after light with different wavelengths passes through the lens assembly. FIG. 6B shows an astigmatism curve of the optical imaging lens assembly according to embodiment 2 under a maximum F-number to represent a tangential image surface curvature and a sagittal image surface curvature. FIG. 6C shows a distortion curve of the optical imaging lens assembly according to embodiment 2 under a maximum F-number to represent distortion values corresponding to different fields of view. According to FIGS. 5A to 6C, it can be seen that the optical imaging lens assembly provided in embodiment 2 may achieve high imaging quality.

Embodiment 3

Figure 7A:
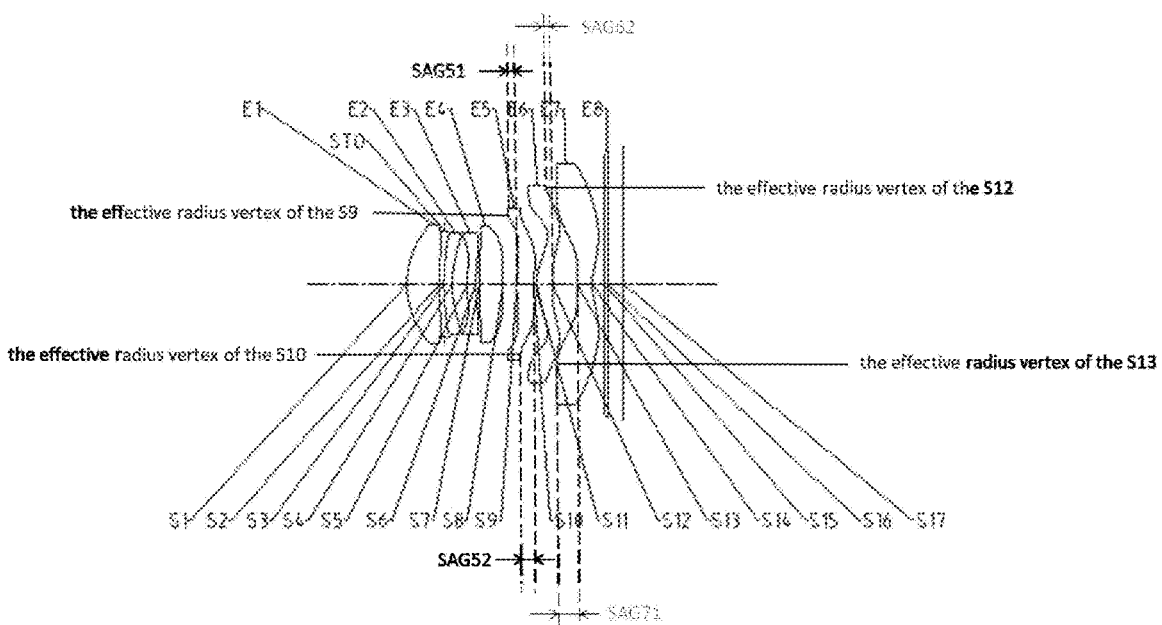
FIGS. 7A and 7B are a structure diagrams of an optical imaging lens assembly according to embodiment 3 of the disclosure respectively.
Figure 7B:
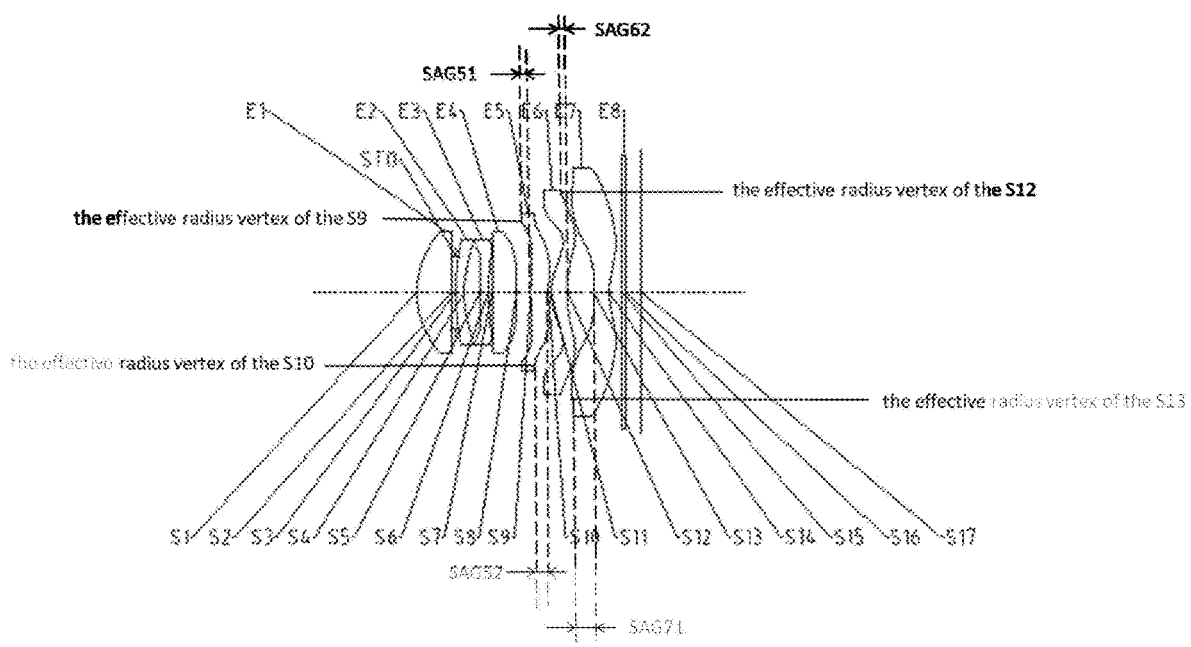

An optical imaging lens assembly according to embodiment 3 of the disclosure will be described below with reference to FIG. 7A to 9C. FIGS. 7A and 7B are a structure diagrams of an optical imaging lens assembly according to embodiment 3 of the disclosure.

As shown in FIG. 7A, the optical imaging lens assembly sequentially includes, from an object side to an image side along an optical axis, a first lens E1, a diaphragm STO, a second lens E2, a third lens E3, a fourth lens E4, a fifth lens E5, a sixth lens E6, a seventh lens E7, and an optical filter E8.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a convex surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In embodiment 3, a value of a total effective focal length f of the optical imaging lens assembly is 4.91 mm. FNOmin is a minimum value of an F-number of the optical imaging lens assembly, and a value of FNOmin is 1.41. FNOmax is a maximum value of the F-number of the optical imaging lens assembly, and a value of FNOmax is 2.04. TTL is an on-axis distance from the object-side surface S1 of the first lens E1 to the imaging surface S17, and a value of TTL is 6.55 mm. ImgH is a half of a diagonal length of an effective pixel region on the imaging surface S17, and a value of ImgH is 4.18 mm.

Table 5 shows a basic parameter table of the optical imaging lens assembly of embodiment 3, and units of the curvature radius, the thickness and the focal length are all millimeter (mm). Table 6 shows high-order coefficients that can be used for each aspheric mirror surface in embodiment 3. A surface type of each aspheric surface may be defined by the formula (1) given in embodiment 1.

TABLE 5

| | | | | Material | | | |
|---|---|---|---|---|---|---|---|
| Surface number | Surface type | Curvature radius | Thickness | Refractive index | Abbe number | Focal length | Conic coefficient |
| OBJ | Spherical | Infinite | Infinite | | | | |
| S1 | Aspheric | 2.6549 | 0.9983 | 1.55 | 56.1 | 5.27 | 0.0312 |
| S2 | Aspheric | 29.5000 | 0.1420 | | | | 89.5428 |
| STO | Spherical | Infinite | −0.0170 | | | | |
| S3 | Aspheric | 4.3396 | 0.2638 | 1.68 | 19.2 | −12.03 | 3.2124 |
| S4 | Aspheric | 2.7628 | 0.4638 | | | | 0.0430 |
| S5 | Aspheric | 7.6376 | 0.2500 | 1.68 | 19.2 | −24.49 | 8.5262 |
| S6 | Aspheric | 5.1610 | 0.1072 | | | | −1.0000 |
| S7 | Aspheric | 14.8045 | 0.7168 | 1.57 | 37.3 | 19.15 | −19.9725 |

TABLE 5-continued

| Surface number | Surface type | Curvature radius | Thickness | Material Refractive index | Abbe number | Focal length | Conic coefficient |
|---|---|---|---|---|---|---|---|
| S8 | Aspheric | −40.9504 | 0.4084 | | | | 0.0000 |
| S9 | Aspheric | 8.5898 | 0.5097 | 1.55 | 56.1 | −6.22 | 0.0000 |
| S10 | Aspheric | 2.3832 | 0.0762 | | | | −2.2793 |
| S11 | Aspheric | 1.4042 | 0.4903 | 1.55 | 56.1 | 2.70 | −1.0000 |
| S12 | Aspheric | 26.5673 | 0.7453 | | | | 5.9510 |
| S13 | Aspheric | 7.9736 | 0.4550 | 1.55, | 56.1 | −3.96 | −10.0742 |
| S14 | Aspheric | 1.6674 | 0.3802 | | | | −1.0635 |
| S15 | Spherical | Infinite | 0.1100 | 1.52 | 64.2 | | |
| S16 | Spherical | Infinite | 0.4530 | | | | |
| S17 | Spherical | Infinite | | | | | |

TABLE 6

| Surface number | A4 | A6 | A8 | A10 | A12 | A14 | A16 |
|---|---|---|---|---|---|---|---|
| S1 | −9.1139E−04 | 1.2916E−03 | −4.0644E−04 | −9.5931E−03 | 3.1165E−02 | −5.1360E−02 | 5.2557E−02 |
| S2 | −3.8977E−02 | 5.3788E−02 | 6.4452E−03 | −2.1352E−01 | 5.3395E−01 | −7.6474E−01 | 7.2433E−01 |
| S3 | −1.0539E−01 | 1.3732E−01 | −2.1361E−01 | 3.6953E−01 | −5.3735E−01 | 5.3642E−01 | −3.0936E−01 |
| S4 | −8.0106E−02 | 4.0842E−02 | 1.4112E−01 | −6.8184E−01 | 1.6034E+00 | −2.4168E+00 | 2.4527E+00 |
| S5 | −6.9462E−02 | 1.7051E−01 | −1.0225E+00 | 3.8946E+00 | −9.9866E+00 | 1.7650E+01 | −2.1925E+01 |
| S6 | −5.3737E−02 | 9.1644E−02 | −3.1945E−01 | 8.5105E−01 | −1.5632E+00 | 1.9889E+00 | −1.7819E+00 |
| S7 | −3.1022E−02 | 3.8872E−02 | −6.2489E−02 | 7.9247E−02 | 1.0126E−02 | −1.9681E−01 | 3.2636E−01 |
| S8 | −2.7149E−02 | −8.4498E−02 | 4.1438E−01 | −1.2139E+00 | 2.3483E+00 | −3.1627E+00 | 3.0467E+00 |
| S9 | −5.1605E−02 | 5.9952E−02 | −8.7582E−02 | 1.6002E−01 | −1.7224E−01 | 3.3019E−01 | −2.7680E−01 |
| S10 | −3.3446E−01 | 2.2759E−01 | −9.2132E−02 | 1.4358E−02 | 2.8857E−03 | 3.6177E−05 | −1.3595E−03 |
| S11 | −1.7684E−01 | 1.3135E−01 | −9.7636E−02 | 3.5185E−02 | 1.0415E−02 | −2.1175E−02 | 1.3269E−02 |
| S12 | 1.4695E−01 | −4.1403E−02 | −9.9652E−02 | 1.3574E−01 | −9.1852E−02 | 4.0025E−02 | −1.2081E−02 |
| S13 | −1.9348E−01 | 8.6169E−02 | −2.6661E−02 | 3.3366E−03 | 3.1103E−03 | −2.2951E−03 | 7.9000E−04 |
| S14 | −2.2336E−01 | 1.3086E−01 | −6.5306E−02 | 2.5470E−02 | −7.4612E−03 | 1.6185E−03 | −2.5929E−04 |

| Surface number | A18 | A20 | A22 | A24 | A26 | A28 | A30 |
|---|---|---|---|---|---|---|---|
| S1 | −3.5514E−02 | 1.6129E−02 | −4.8757E−03 | 9.4102E−04 | −1.0494E−04 | 5.1460E−06 | 0.0000E+00 |
| S2 | −4.7189E−01 | 2.1274E−01 | −6.5240E−02 | 1.2990E−02 | −1.5143E−03 | 7.8439E−05 | 0.0000E+00 |
| S3 | 3.8277E−02 | 8.9667E−02 | −7.9676E−02 | 3.4237E−02 | −8.5006E−03 | 1.1690E−03 | −6.9290E−05 |
| S4 | −1.6884E+00 | 7.7517E−01 | −2.2652E−01 | 3.7946E−02 | −2.7574E−03 | 0.0000E+00 | 0.0000E+00 |
| S5 | 1.9274E+01 | −1.1915E+01 | 5.0598E+00 | −1.4042E+00 | 2.2916E−01 | −1.6665E−02 | 0.0000E+00 |
| S6 | 1.1295E+00 | −5.0219E−01 | 1.5271E−01 | −3.0173E−02 | 3.4841E−03 | −1.7823E−04 | 0.0000E+00 |
| S7 | −2.9614E−01 | 1.7021E−01 | −6.3422E−02 | 1.4854E−02 | −1.9857E−03 | 1.1542E−04 | 0.0000E+00 |
| S8 | −2.1247E+00 | 1.0735E+00 | −3.8869E−01 | 9.8196E−02 | −1.6421E−02 | 1.6318E−03 | −7.2889E−05 |
| S9 | 1.6256E−01 | −6.7503E−02 | 1.9746E−02 | −3.9814E−03 | 5.2661E−04 | −4.1099E−05 | 1.4331E−06 |
| S10 | 4.2843E−04 | 1.0833E−04 | −1.0328E−04 | 2.9701E−05 | −4.4038E−06 | 3.4111E−07 | −1.0970E−08 |
| S11 | −5.0182E−03 | 1.2788E−03 | −2.2521E−04 | 2.7072E−05 | −2.1206E−06 | 9.7523E−08 | −1.9965E−09 |
| S12 | 2.6003E−03 | −4.0228E−04 | 4.4381E−05 | −3.4037E−06 | 1.7217E−07 | −5.1562E−09 | 6.9111E−11 |
| S13 | −1.6970E−04 | 2.4536E−05 | −2.4391E−06 | 1.6510E−07 | −7.2902E−09 | 1.8969E−10 | −2.2090E−12 |
| S14 | 3.0735E−05 | −2.7013E−06 | 1.7573E−07 | −8.3554E−09 | 2.7939E−10 | −5.9448E−12 | 6.0702E−14 |

Figure 8A:
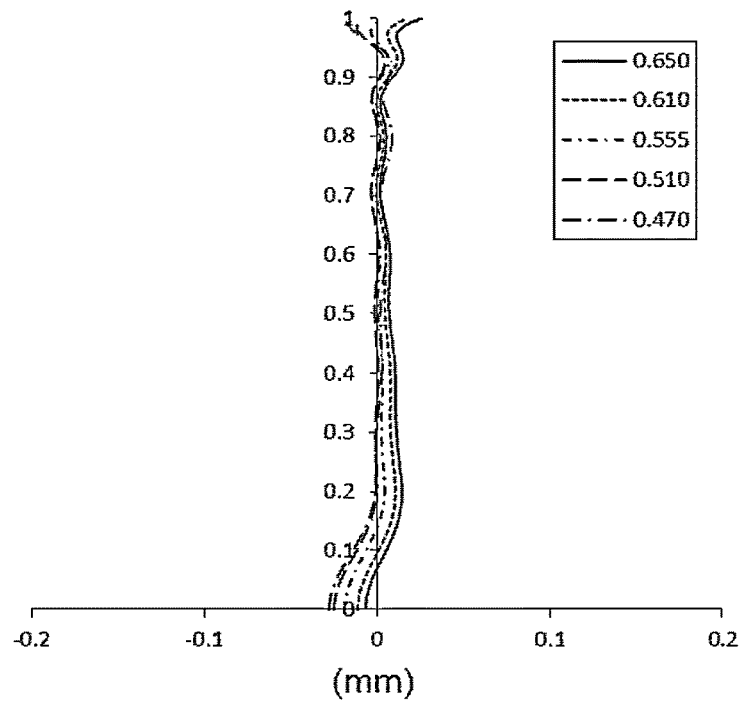
FIG. 8A to FIG. 8C show a longitudinal aberration curve, an astigmatism curve and a distortion curve of an optical imaging lens assembly under a maximum F-number according to embodiment 3 respectively.
Figure 8B:
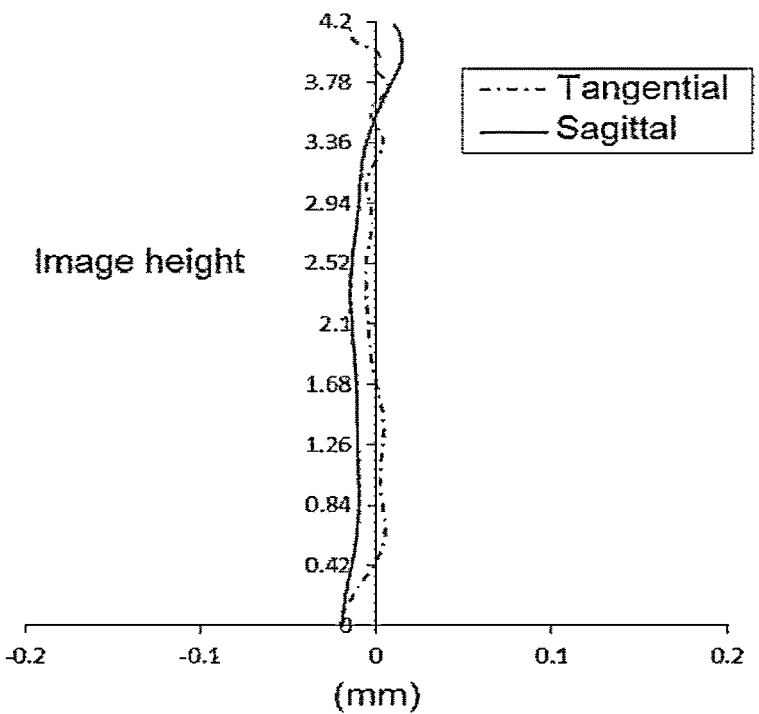
Figure 8C:
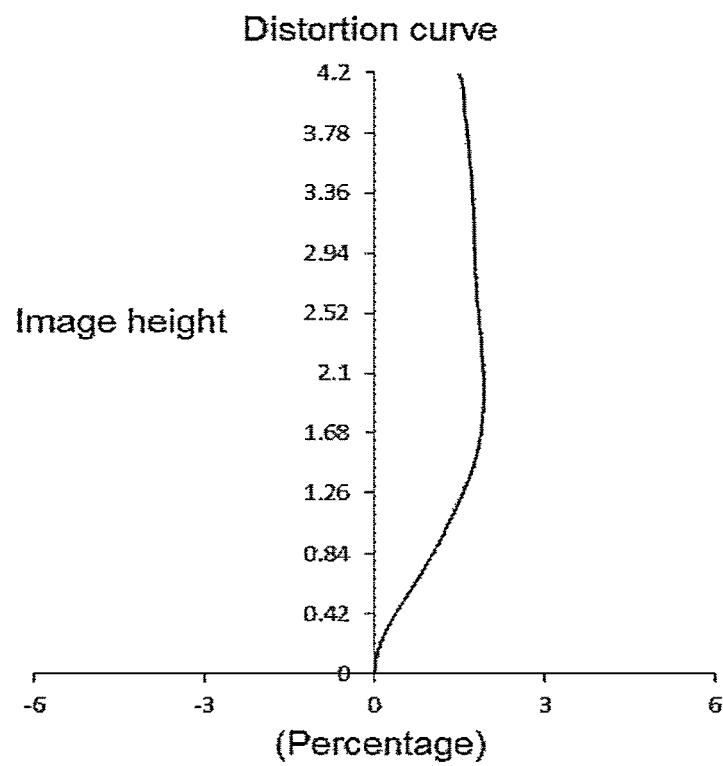
Figure 9A:
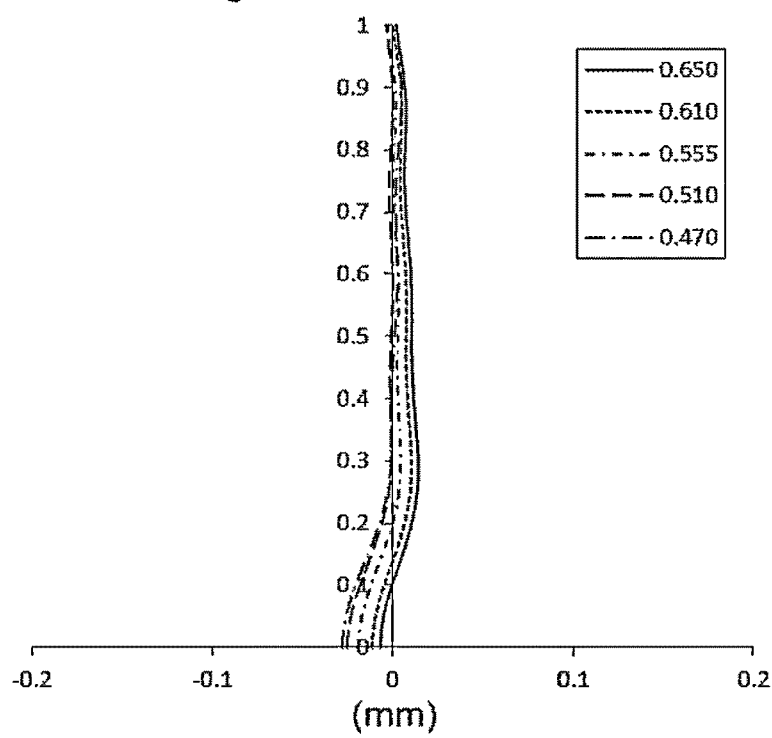
FIGS. 9A to 9C show a longitudinal aberration curve, an astigmatism curve and a distortion curve of an optical imaging lens assembly under a minimum F-number according to embodiment 3 respectively.
Figure 9B:
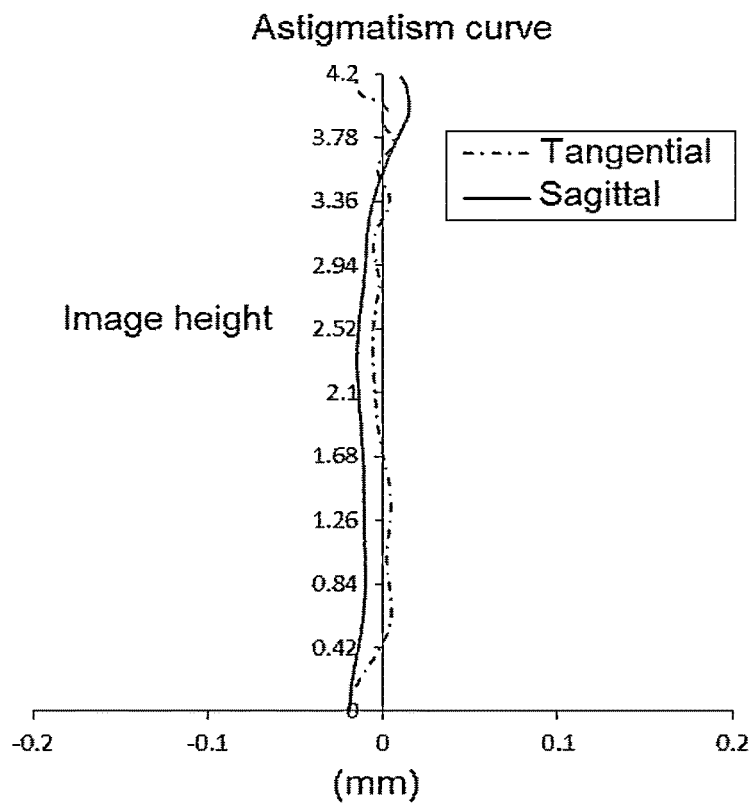
Figure 9C:
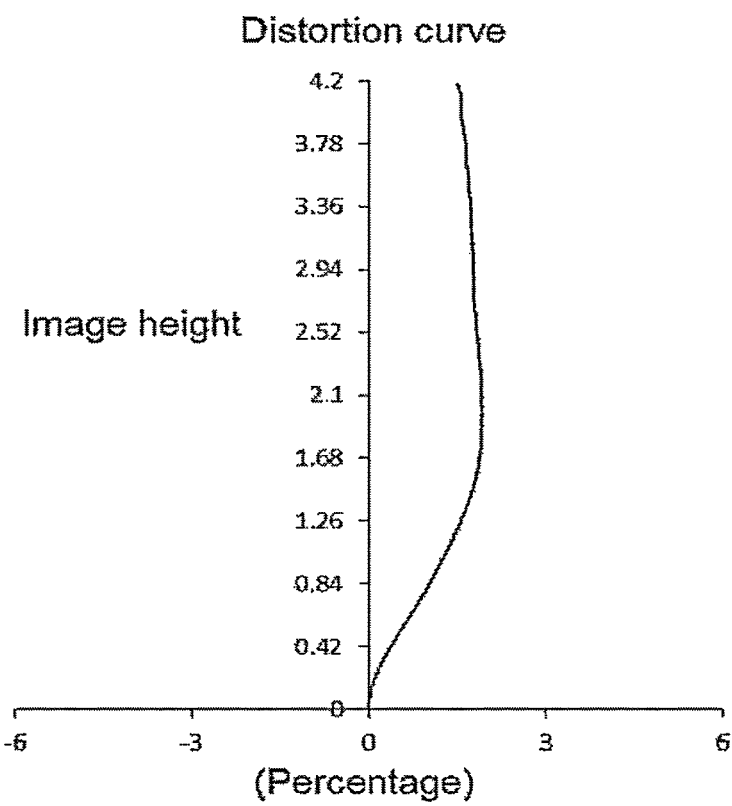

FIG. 8A shows a longitudinal aberration curve of the optical imaging lens assembly according to embodiment 3 under a minimum F-number to represent deviation of a convergence focal point after light with different wavelengths passes through the lens assembly. FIG. 8B shows an astigmatism curve of the optical imaging lens assembly according to embodiment 3 under a minimum F-number to represent a tangential image surface curvature and a sagittal image surface curvature. FIG. 8C shows a distortion curve of the optical imaging lens assembly according to embodiment 3 under a minimum F-number to represent distortion values corresponding to different fields of view. FIG. 9A shows a longitudinal aberration curve of the optical imaging lens assembly according to embodiment 3 under a maximum F-number to represent deviation of a convergence focal point after light with different wavelengths passes through the lens assembly. FIG. 9B shows an astigmatism curve of the optical imaging lens assembly according to embodiment 3 under a maximum F-number to represent a tangential image surface curvature and a sagittal image surface curvature. FIG. 9C shows a distortion curve of the optical imaging lens assembly according to embodiment 3 under a maximum F-number to represent distortion values corresponding to different fields of view. According to FIGS. 8A to 9C, it can be seen that the optical imaging lens assembly provided in embodiment 3 may achieve high imaging quality.

Embodiment 4

Figure 10A:
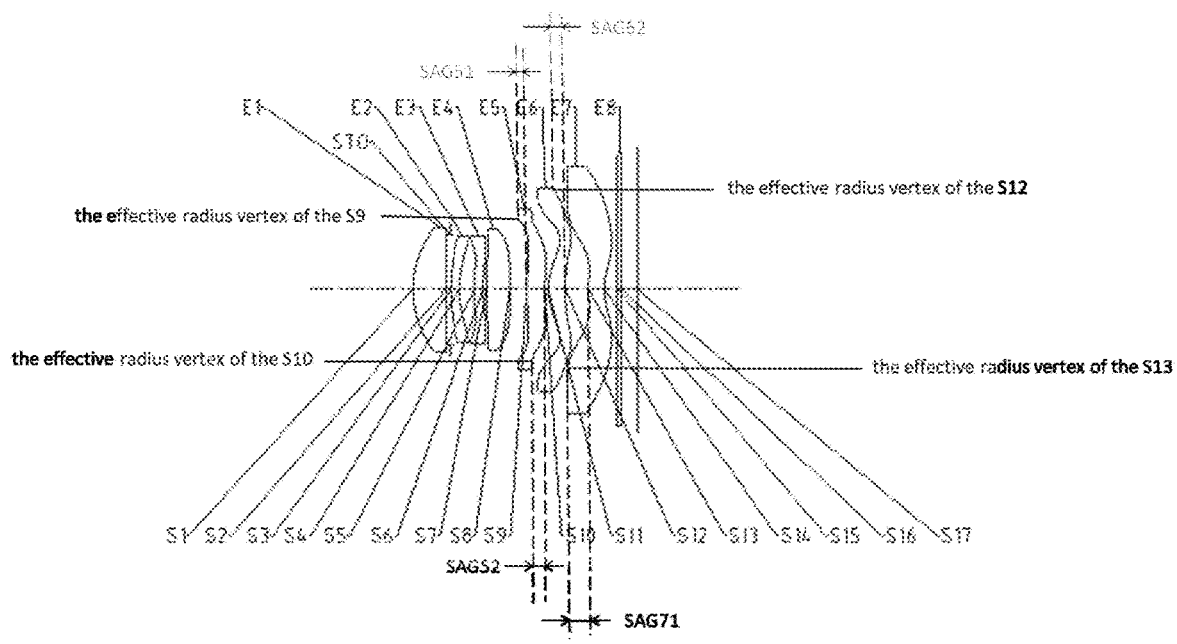
FIGS. 10A and 10B are a structure diagrams of an optical imaging lens assembly according to embodiment 4 of the disclosure respectively.
Figure 10B:
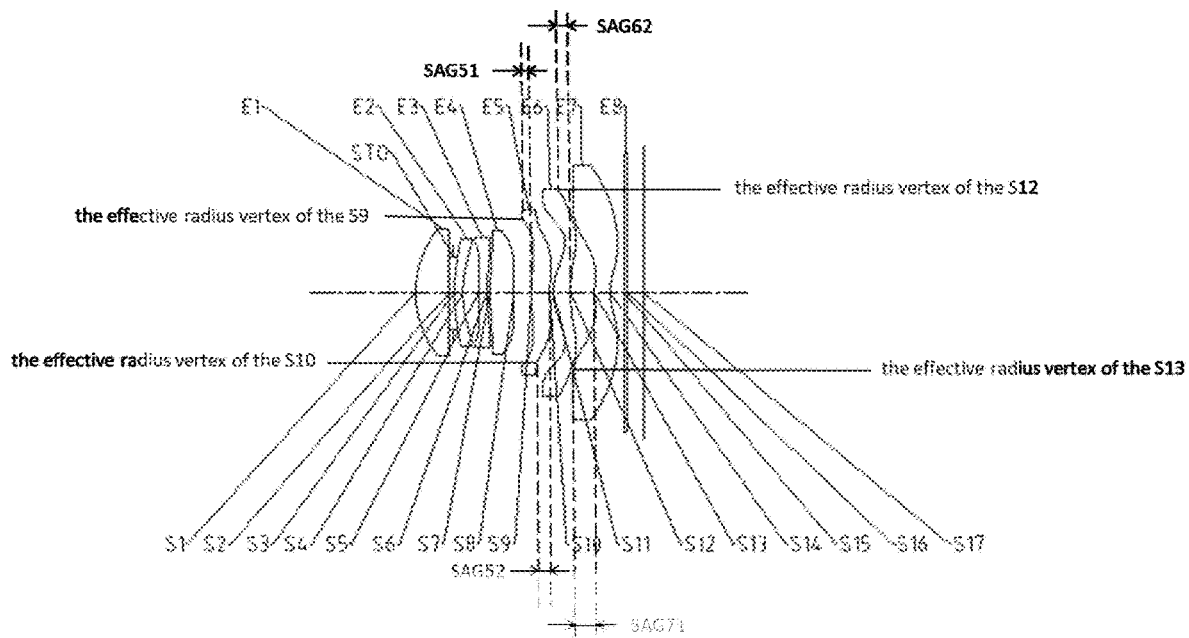

An optical imaging lens assembly according to embodiment 4 of the disclosure will be described below with reference to FIGS. 10A to 12C. FIG. 10A is a structure diagram of an optical imaging lens assembly according to embodiment 4 of the disclosure.

As shown in FIG. 10A, the optical imaging lens assembly sequentially includes, from an object side to an image side along an optical axis, a first lens E1, a diaphragm STO, a second lens E2, a third lens E3, a fourth lens E4, a fifth lens E5, a sixth lens E6, a seventh lens E7, and an optical filter E8.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In embodiment 4, a value of a total effective focal length f of the optical imaging lens assembly is 4.86 mm. FNOmin is a minimum value of an F-number of the optical imaging lens assembly, and a value of FNOmin is 1.40. FNOmax is a maximum value of the F-number of the optical imaging lens assembly, and a value of FNOmax is 2.05. TTL is an on-axis distance from the object-side surface S1 of the first lens E1 to the imaging surface S17, and a value of TTL is 6.55 mm. InngH is a half of a diagonal length of an effective pixel region on the imaging surface S17, and a value of InngH is 4.18 mm.

Table 7 shows a basic parameter table of the optical imaging lens assembly of embodiment 4, and units of the curvature radius, the thickness and the focal length are all millimeter (mm). Table 8 shows high-order coefficients that can be used for each aspheric mirror surface in embodiment 4. A surface type of each aspheric surface may be defined by the formula (1) given in embodiment 1.

TABLE 7

| Surface number | Surface type | Curvature radius | Thickness | Refractive index | Abbe number | Focal length | Conic coefficient |
|---|---|---|---|---|---|---|---|
| OBJ | Spherical | Infinite | Infinite | | | | |
| S1 | Aspheric | 2.8288 | 0.9623 | 1.55 | 56.1 | 5.18 | −0.0208 |
| S2 | Spherical | 1.0000E+18 | 0.1173 | | | | |
| STO | Spherical | Infinite | 0.0327 | | | | |
| S3 | Aspheric | 4.4864 | 0.2550 | 1.68 | 19.2 | −10.73 | 3.8191 |
| S4 | Aspheric | 2.7111 | 0.4442 | | | | −0.0532 |
| S5 | Aspheric | 7.8365 | 0.2500 | 1.68 | 19.2 | −17.25 | −14.1662 |
| S6 | Aspheric | 4.6309 | 0.0921 | | | | −1.0000 |
| S7 | Aspheric | 6.1790 | 0.6851 | 1.57 | 37.3 | 13.42 | −44.5485 |
| S8 | Aspheric | 30.7423 | 0.4967 | | | | 0.0000 |
| S9 | Aspheric | 6.9812 | 0.5232 | 1.55 | 56.1 | −10.39 | 0.0000 |
| S10 | Aspheric | 3.0466 | 0.1015 | | | | −5.5009 |
| S11 | Aspheric | 1.6433 | 0.4982 | 1.55 | 56.1 | 3.35 | −1.0000 |
| S12 | Aspheric | 14.5566 | 0.6773 | | | | −1.0000 |
| S13 | Aspheric | 3.8953 | 0.4500 | 1.55 | 56.1 | −4.32 | −27.9518 |
| S14 | Aspheric | 1.4096 | 0.3910 | | | | −1.0855 |
| S15 | Spherical | Infinite | 0.1100 | 1.52 | 64.2 | | |
| S16 | Spherical | Infinite | 0.4633 | | | | |
| S17 | Spherical | Infinite | | | | | |

TABLE 8

| Surface number | A4 | A6 | A8 | A10 | A12 | A14 | A16 |
|---|---|---|---|---|---|---|---|
| S1 | −2.5745E−03 | 1.4932E−03 | 1.6480E−02 | −7.4165E−02 | 1.5508E−01 | −2.0045E−01 | 1.7324E−01 |
| S3 | −4.6899E−02 | 4.1948E−02 | −1.5350E−01 | 4.1725E−01 | −6.5252E−01 | 4.9584E−01 | 1.0713E−01 |
| S4 | −4.6040E−02 | −8.5254E−03 | 1.0089E−01 | −3.7545E−01 | 8.8613E−01 | −1.4018E+00 | 1.5149E+00 |
| S5 | −4.3974E−02 | 1.6450E−01 | −7.3583E−01 | 2.0556E+00 | −4.0641E+00 | 5.7686E+00 | −5.9603E+00 |
| S6 | −8.1911E−02 | 1.9441E−01 | −4.5342E−01 | 7.6157E−01 | −9.2595E−01 | 8.0199E−01 | −4.8697E−01 |
| S7 | −6.4193E−02 | 9.7941E−02 | −5.7724E−02 | −2.4725E−01 | 9.0538E−01 | −1.5692E+00 | 1.7110E+00 |
| S8 | −3.8427E−02 | −9.8366E−02 | 5.3799E−01 | −1.6287E+00 | 3.2259E+00 | −4.4301E+00 | 4.3392E+00 |
| S9 | −3.5527E−02 | −2.9581E−04 | 3.8231E−02 | −2.3276E−02 | −7.4046E−02 | 1.6774E−01 | −1.7531E−01 |
| S10 | −1.5386E−01 | −5.6542E−02 | 2.6008E−01 | −3.3439E−01 | 2.7117E−01 | −1.5770E−01 | 6.8737E−02 |
| S11 | −5.6874E−02 | −6.2998E−02 | 1.3967E−01 | −1.8867E−01 | 1.7335E−01 | −1.1123E−01 | 5.0404E−02 |
| S12 | 9.0314E−02 | 1.9061E−02 | −1.5740E−01 | 1.8110E−01 | −1.1846E−01 | 5.1209E−02 | −1.5444E−02 |
| S13 | −2.0743E−01 | 9.4041E−02 | −3.8536E−02 | 1.3593E−02 | −1.9508E−03 | −6.3422E−04 | 4.0148E−04 |
| S14 | −2.8885E−01 | 1.9403E−01 | −1.1328E−01 | 5.2748E−02 | −1.8730E−02 | 4.9940E−03 | −9.9398E−04 |

TABLE 8-continued

| Surface number | A18 | A20 | A22 | A24 | A26 | A28 | A30 |
|---|---|---|---|---|---|---|---|
| S1 | −1.0302E−01 | 4.2320E−02 | −1.1797E−02 | 2.1294E−03 | −2.2440E−04 | 1.0477E−05 | 0.0000E+00 |
| S3 | −6.7331E−01 | 7.6526E−01 | −4.8771E−01 | 1.9480E−01 | −4.8497E−02 | 6.9081E−03 | −4.3116E−04 |
| S4 | −1.1182E+00 | 5.5316E−01 | −1.7503E−01 | 3.1961E−02 | −2.5579E−03 | 0.0000E+00 | 0.0000E+00 |
| S5 | 4.5033E+00 | −2.4667E+00 | 9.5465E−01 | −2.4756E−01 | 3.8576E−02 | −2.7271E−03 | 0.0000E+00 |
| S6 | 2.0054E−01 | −5.1310E−02 | 5.9710E−03 | 4.7759E−04 | −2.2175E−04 | 1.8294E−05 | 0.0000E+00 |
| S7 | −1.2563E+00 | 6.3073E−01 | −2.1352E−01 | 4.6561E−02 | −5.8964E−03 | 3.2897E−04 | 0.0000E+00 |
| S8 | −3.0712E+00 | 1.5730E+00 | −5.7691E−01 | 1.4758E−01 | −2.4987E−02 | 2.5143E−03 | −1.1375E−04 |
| S9 | 1.1434E−01 | −5.0230E−02 | 1.5165E−02 | −3.1109E−03 | 4.1481E−04 | −3.2436E−05 | 1.1283E−06 |
| S10 | −2.2868E−02 | 5.8219E−03 | −1.1173E−03 | 1.5582E−04 | −1.4803E−05 | 8.5046E−07 | −2.2168E−08 |
| S11 | −1.6301E−02 | 3.7770E−03 | −6.2196E−04 | 7.0994E−05 | −5.3347E−06 | 2.3713E−07 | −4.7205E−09 |
| S12 | 3.3301E−03 | −5.1691E−04 | 5.7289E−05 | −4.4182E−06 | 2.2489E−07 | −6.7782E−09 | 9.1390E−11 |
| S13 | −1.0321E−04 | 1.6183E−05 | −1.6775E−06 | 1.1611E−07 | −5.1837E−09 | 1.3541E−10 | −1.5753E−12 |
| S14 | 1.4694E−04 | −1.5999E−05 | 1.2629E−06 | −7.0202E−08 | 2.6041E−09 | −5.7853E−11 | 5.8216E−13 |

Figure 11A:
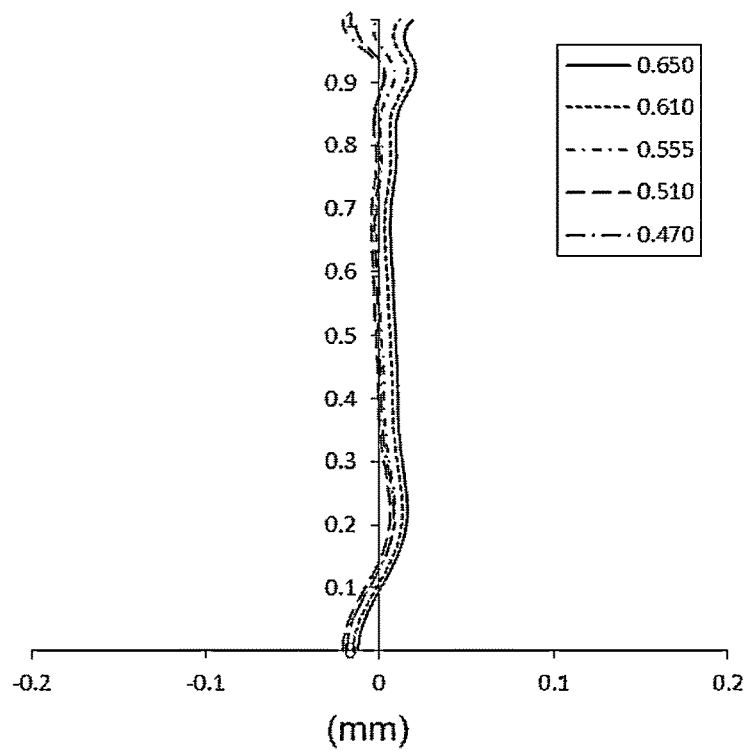
FIGS. 11A to 11C show a longitudinal aberration curve, an astigmatism curve and a distortion curve of an optical imaging lens assembly under a maximum F-number according to embodiment 4 respectively.
Figure 11B:
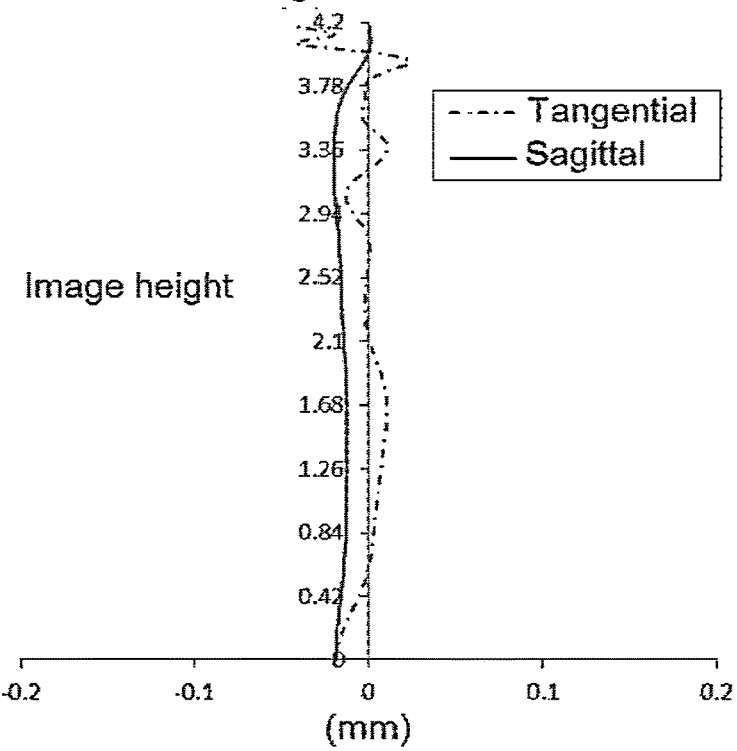
Figure 11C:
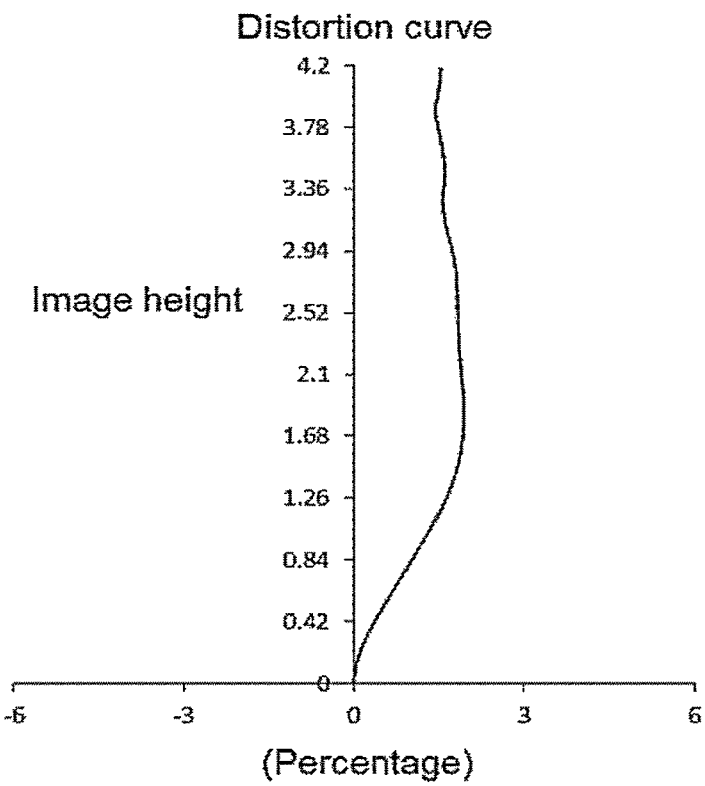
Figure 12A:
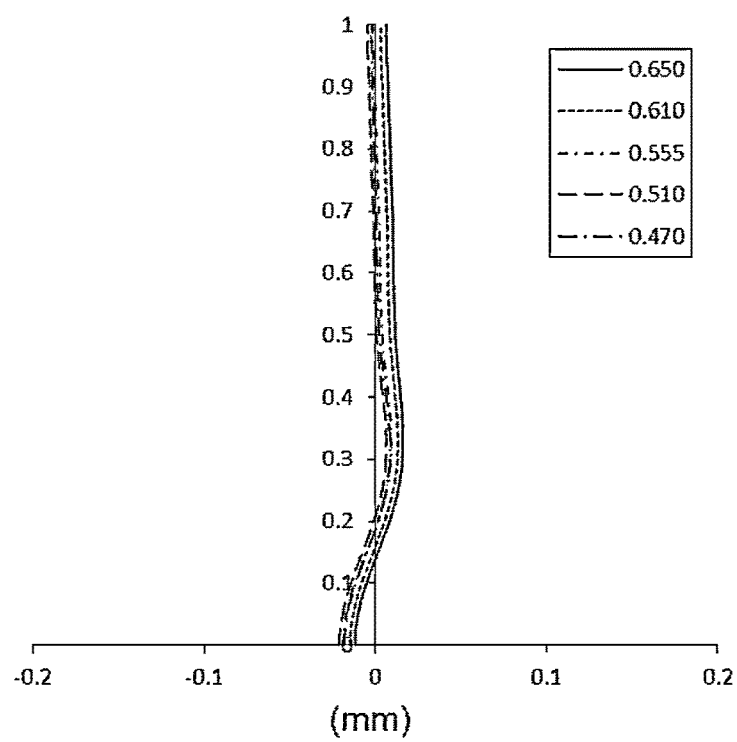
FIGS. 12A to 12C show a longitudinal aberration curve, an astigmatism curve and a distortion curve of an optical imaging lens assembly under a minimum F-number according to embodiment 4 respectively.
Figure 12B:
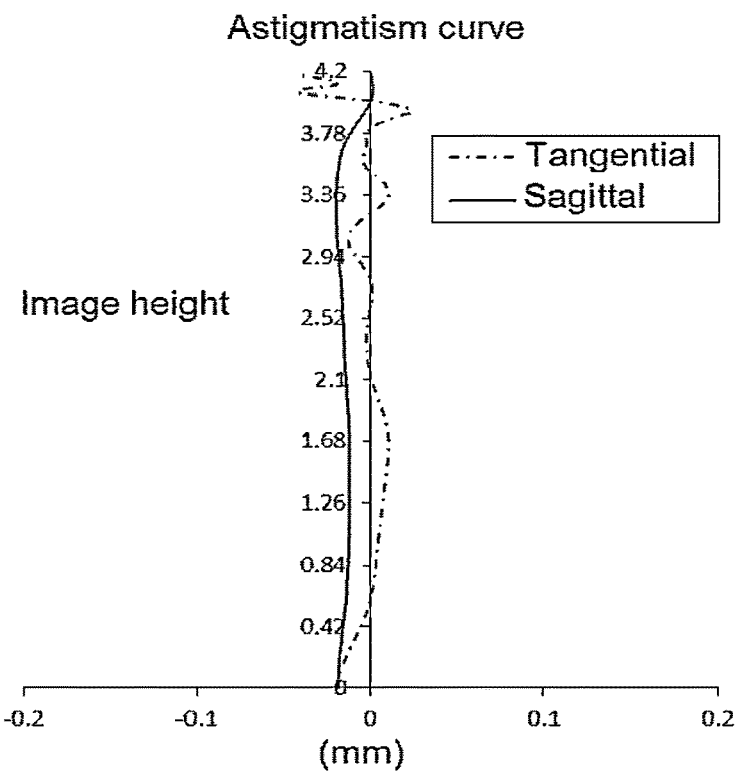
Figure 12C:
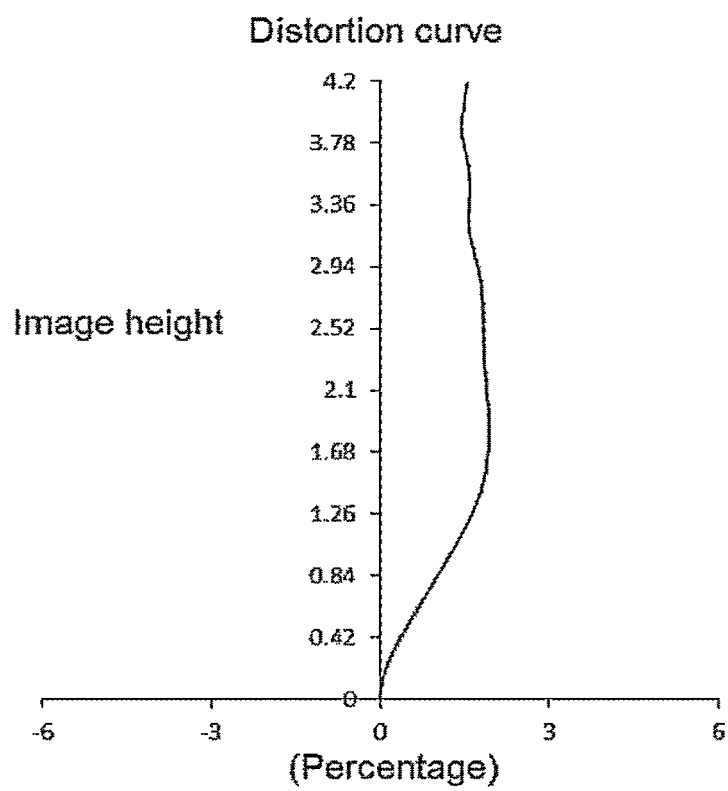

FIG. 11A shows a longitudinal aberration curve of the optical imaging lens assembly according to embodiment 4 under a minimum F-number to represent deviation of a convergence focal point after light with different wavelengths passes through the lens assembly. FIG. 11B shows an astigmatism curve of the optical imaging lens assembly according to embodiment 4 under a minimum F-number to represent a tangential image surface curvature and a sagittal image surface curvature. FIG. 11C shows a distortion curve of the optical imaging lens assembly according to embodiment 4 under a minimum F-number to represent distortion values corresponding to different fields of view. FIG. 12A shows a longitudinal aberration curve of the optical imaging lens assembly according to embodiment 4 under a maximum F-number to represent deviation of a convergence focal point after light with different wavelengths passes through the lens assembly. FIG. 12B shows an astigmatism curve of the optical imaging lens assembly according to embodiment 4 under a maximum F-number to represent a tangential image surface curvature and a sagittal image surface curvature. FIG. 12C shows a distortion curve of the optical imaging lens assembly according to embodiment 4 under a maximum F-number to represent distortion values corresponding to different fields of view. According to FIGS. 11A to 12C, it can be seen that the optical imaging lens assembly provided in embodiment 4 may achieve high imaging quality.

Embodiment 5

Figure 13A:
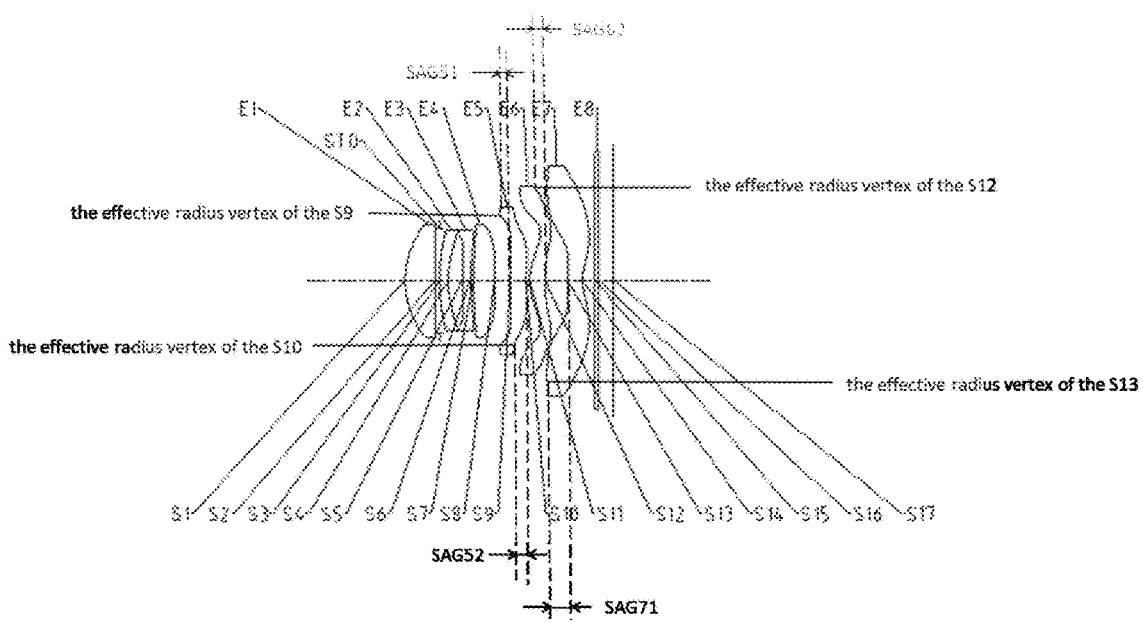
FIGS. 13A and 13B are a structure diagrams of an optical imaging lens assembly according to embodiment 5 of the disclosure respectively.
Figure 13B:
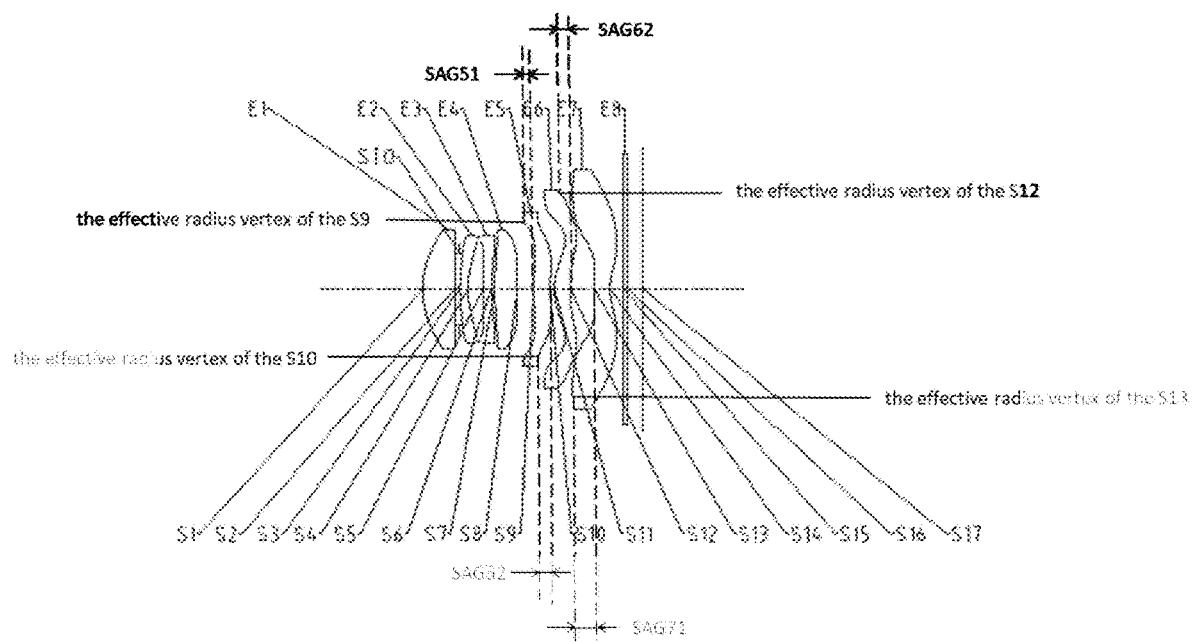

An optical imaging lens assembly according to embodiment 5 of the disclosure will be described below with reference to FIGS. 13A to 15C. FIG. 13A is a structure diagram of an optical imaging lens assembly according to embodiment 5 of the disclosure.

As shown in FIG. 13A, the optical imaging lens assembly sequentially includes, from an object side to an image side along an optical axis, a first lens E1, a diaphragm STO, a second lens E2, a third lens E3, a fourth lens E4, a fifth lens E5, a sixth lens E6, a seventh lens E7, and an optical filter E8.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In embodiment 5, a value of a total effective focal length f of the optical imaging lens assembly is 4.85 mm. FNOmin is a minimum value of an F-number of the optical imaging lens assembly, and a value of FNOmin is 1.40. FNOmax is a maximum value of the F-number of the optical imaging lens assembly, and a value of FNOmax is 2.04. TTL is an on-axis distance from the object-side surface S1 of the first lens E1 to the imaging surface S17, and a value of TTL is 6.42 mm. InngH is a half of a diagonal length of an effective pixel region on the imaging surface S17, and a value of InngH is 4.18 mm.

Table 9 shows a basic parameter table of the optical imaging lens assembly of embodiment 5, and units of the curvature radius, the thickness and the focal length are all millimeter (mm). Table 10 shows high-order coefficients that can be used for each aspheric mirror surface in embodiment 5. A surface type of each aspheric surface may be defined by the formula (1) given in embodiment 1.

TABLE 9

| Surface number | Surface type | Curvature radius | Thickness | Material Refractive index | Material Abbe number | Focal length | Conic coefficient |
|---|---|---|---|---|---|---|---|
| OBJ | Spherical | Infinite | Infinite | | | | |
| S1 | Aspheric | 2.7392 | 0.9257 | 1.55 | 56.1 | 5.02 | −0.0493 |
| S2 | Spherical | 1.0000E+18 | 0.1490 | | | | |
| STO | Spherical | Infinite | 0.0010 | | | | |
| S3 | Aspheric | 4.5564 | 0.2550 | 1.68 | 19.2 | −9.82 | 3.8625 |
| S4 | Aspheric | 2.6437 | 0.4372 | | | | −0.0865 |
| S5 | Aspheric | 7.1468 | 0.2500 | 1.68 | 19.2 | −23.18 | −16.3734 |
| S6 | Aspheric | 4.8426 | 0.0920 | | | | −1.0000 |
| S7 | Aspheric | 6.8794 | 0.6575 | 1.57 | 37.3 | 14.17 | −1.0000 |
| S8 | Aspheric | 44.5293 | 0.4752 | | | | 0.0000 |
| S9 | Aspheric | 7.6369 | 0.4808 | 1.55 | 56.1 | −11.71 | 0.0000 |
| S10 | Aspheric | 3.4033 | 0.1187 | | | | −8.6139 |
| S11 | Aspheric | 1.7613 | 0.4746 | 1.55 | 56.1 | 3.67 | −1.0000 |
| S12 | Aspheric | 13.1476 | 0.6920 | | | | −1.0000 |
| S13 | Aspheric | 3.5959 | 0.4500 | 1.55 | 56.1 | −4.34 | −25.3140 |
| S14 | Aspheric | 1.3658 | 0.3895 | | | | −1.1381 |
| S15 | Spherical | Infinite | 0.1100 | 1.52 | 64.2 | | |
| S16 | Spherical | Infinite | 0.4618 | | | | |
| S17 | Spherical | Infinite | | | | | |

TABLE 10

| Surface number | A4 | A6 | A8 | A10 | A12 | A14 | A16 |
|---|---|---|---|---|---|---|---|
| S1 | −4.6556E−03 | 2.0728E−02 | −7.5518E−02 | 1.8734E−01 | −3.2053E−01 | 3.7858E−01 | −3.1175E−01 |
| S3 | −4.9594E−02 | 3.5365E−02 | −7.6853E−02 | 5.8784E−02 | 4.0248E−01 | −1.5854E+00 | 2.9483E+00 |
| S4 | −5.0267E−02 | −2.9920E−04 | 7.5647E−02 | −3.0014E−01 | 7.4200E−01 | −1.2298E+00 | 1.3913E+00 |
| S5 | −3.7088E−02 | 1.5130E−01 | −7.1784E−01 | 2.0135E+00 | −3.9205E+00 | 5.4547E+00 | −5.5336E+00 |
| S6 | −6.4358E−02 | 1.7963E−01 | −5.2162E−01 | 1.0376E+00 | −1.4721E+00 | 1.5081E+00 | −1.1200E+00 |
| S7 | −7.1034E−02 | 1.2604E−01 | −2.2711E−01 | 2.1693E−01 | 1.1397E−01 | −6.6233E−01 | 1.0009E+00 |
| S8 | −3.2443E−02 | −1.1773E−01 | 6.7204E−01 | −2.1396E+00 | 4.4287E+00 | −6.3353E+00 | 6.4536E+00 |
| S9 | −4.7343E−02 | 4.5556E−03 | 5.1048E−02 | −3.3411E−02 | −1.1831E−01 | 2.8607E−01 | −3.2073E−01 |
| S10 | −1.3692E−01 | −9.4190E−02 | 3.3182E−01 | −4.2526E−01 | 3.5269E−01 | −2.1198E−01 | 9.5993E−02 |
| S11 | −2.4390E−02 | −1.1218E−01 | 1.9808E−01 | −2.4416E−01 | 2.2022E−01 | −1.4377E−01 | 6.7169E−02 |
| S12 | 9.6162E−02 | 1.9864E−02 | −1.7901E−01 | 2.2126E−01 | −1.5442E−01 | 7.0640E−02 | −2.2425E−02 |
| S13 | −2.1652E−01 | 1.0724E−01 | −4.6995E−02 | 1.6449E−02 | −2.4942E−03 | −5.8680E−04 | 4.0580E−04 |
| S14 | −3.1605E−01 | 2.3842E−01 | −1.5748E−01 | 8.1890E−02 | −3.1844E−02 | 9.1013E−03 | −1.9044E−03 |

| Surface number | A18 | A20 | A22 | A24 | A26 | A28 | A30 |
|---|---|---|---|---|---|---|---|
| S1 | 1.7988E−01 | −7.2303E−02 | 1.9811E−02 | −3.5251E−03 | 3.6699E−04 | −1.6960E−05 | 0.0000E+00 |
| S3 | −3.4056E+00 | 2.6272E+00 | −1.3807E+00 | 4.8928E−01 | −1.1203E−01 | 1.4981E−02 | −8.8899E−04 |
| S4 | −1.0727E+00 | 5.5272E−01 | −1.8157E−01 | 3.4315E−02 | −2.8338E−03 | 0.0000E+00 | 0.0000E+00 |
| S5 | 4.1217E+00 | −2.2365E+00 | 8.6176E−01 | −2.2362E−01 | 3.5033E−02 | −2.5010E−03 | 0.0000E+00 |
| S6 | 5.9881E−01 | −2.2583E−01 | 5.7879E−02 | −9.4687E−03 | 8.8184E−04 | −3.5542E−05 | 0.0000E+00 |
| S7 | −8.7873E−01 | 4.9829E−01 | −1.8497E−01 | 4.3435E−02 | −5.8523E−03 | 3.4441E−04 | 0.0000E+00 |
| S8 | −4.7464E+00 | 2.5251E+00 | −9.6174E−01 | 2.5547E−01 | −4.4912E−02 | 4.6926E−03 | −2.2047E−04 |
| S9 | 2.2469E−01 | −1.0610E−01 | 3.4441E−02 | −7.5986E−03 | 1.0899E−03 | −9.1677E−05 | 3.4307E−06 |
| S10 | −3.3248E−02 | 8.8181E−03 | −1.7636E−03 | 2.5643E−04 | −2.5405E−05 | 1.5226E−06 | −4.1410E−08 |
| S11 | −2.2486E−02 | 5.3985E−03 | −9.2129E−04 | 1.0899E−04 | −8.4878E−06 | 3.9102E−07 | −8.0672E−09 |
| S12 | 5.0762E−03 | −8.2639E−04 | 9.6035E−05 | −7.7663E−06 | 4.1460E−07 | −1.3108E−08 | 1.8544E−10 |
| S13 | −1.0548E−04 | 1.6601E−05 | −1.7256E−06 | 1.1974E−07 | −5.3596E−09 | 1.4036E−10 | −1.6371E−12 |
| S14 | 2.9147E−04 | −3.2496E−05 | 2.6071E−06 | −1.4658E−07 | 5.4845E−09 | −1.2273E−10 | 1.2438E−12 |

Figure 14A:
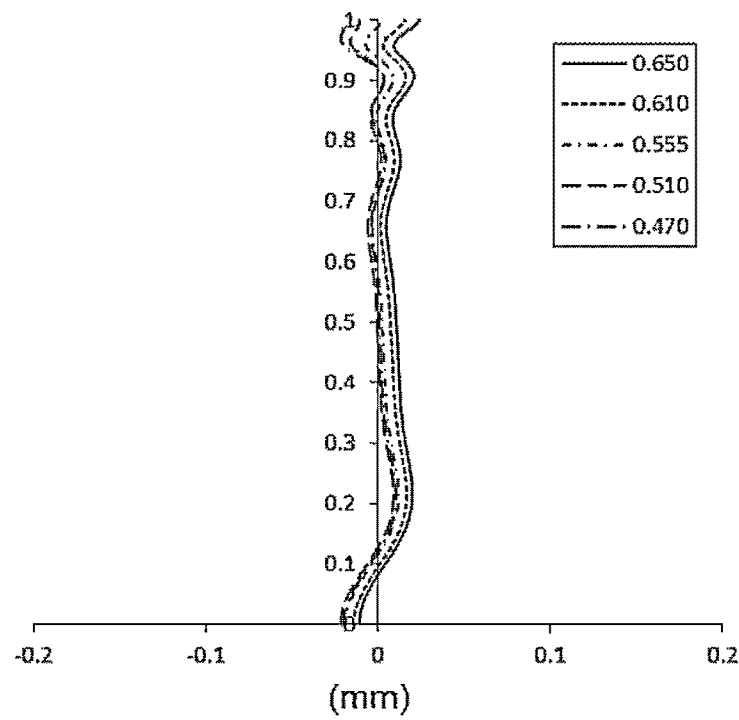
FIGS. 14A to 14C show a longitudinal aberration curve, an astigmatism curve and a distortion curve of an optical imaging lens assembly under a maximum F-number according to embodiment 5 respectively.
Figure 14B:
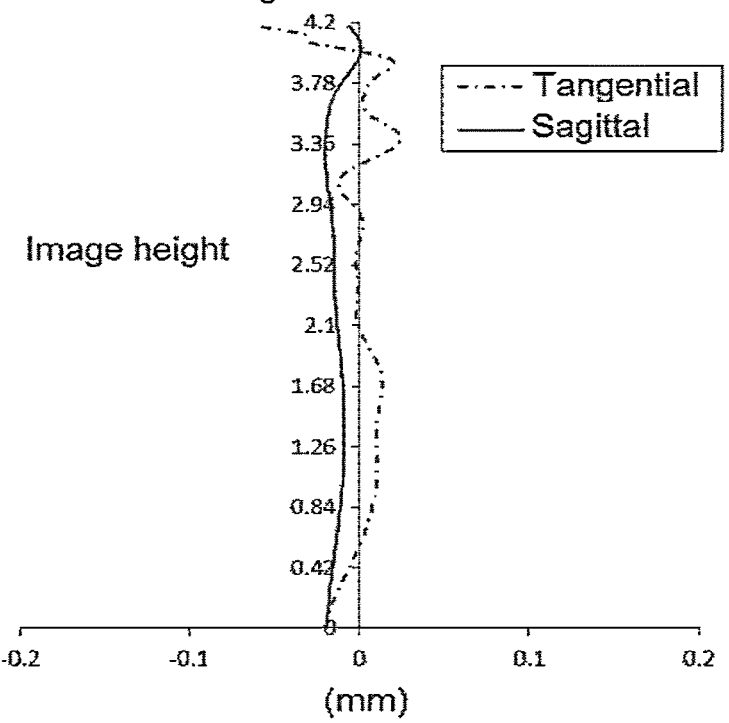
Figure 14C:
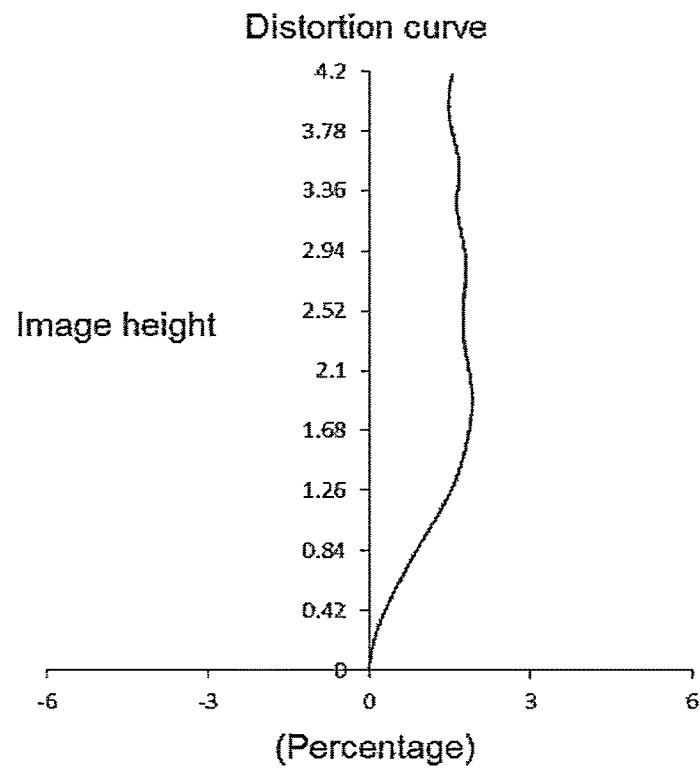
Figure 15A:
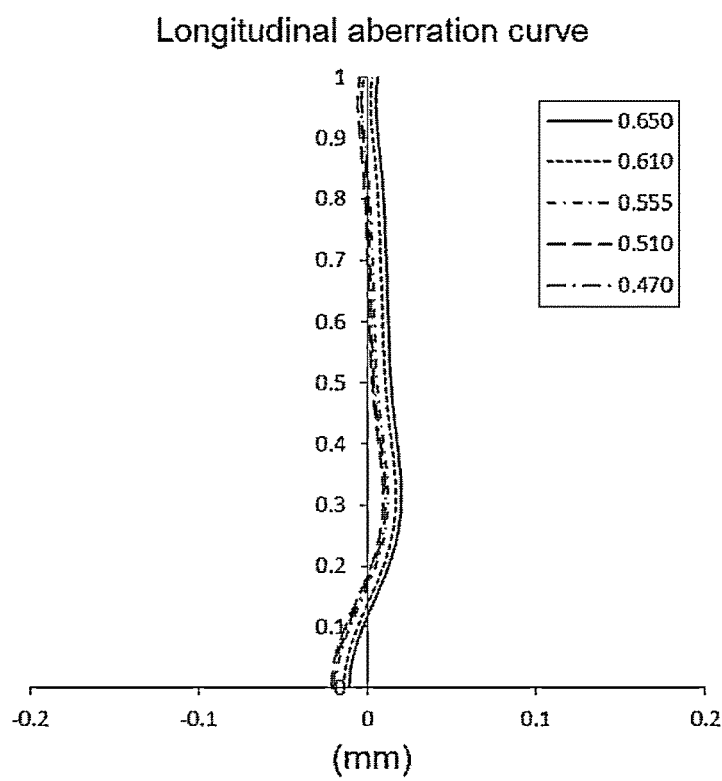
FIGS. 15A to 15C show a longitudinal aberration curve, an astigmatism curve and a distortion curve of an optical imaging lens assembly under a minimum F-number according to embodiment 5 respectively.
Figure 15B:
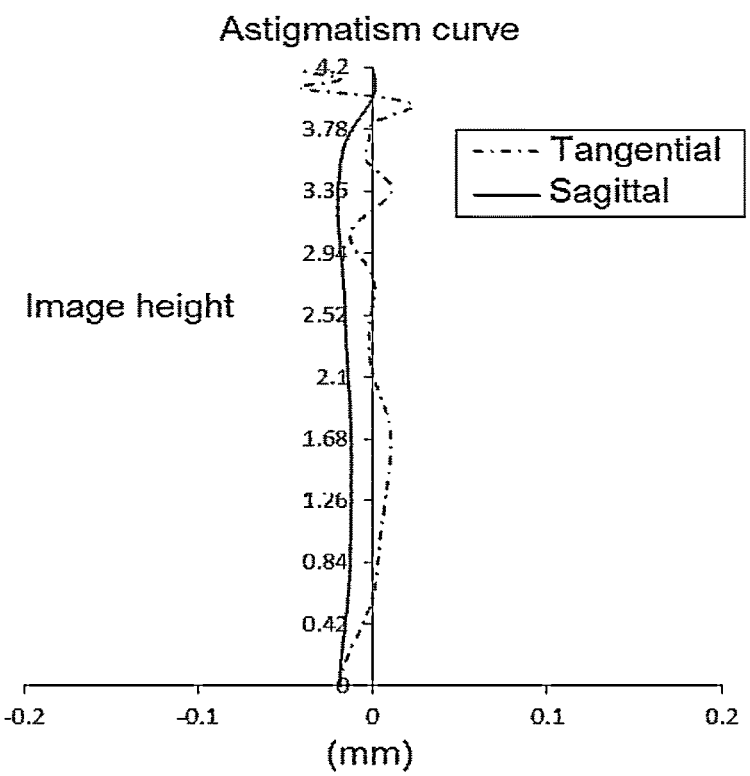
Figure 15C:
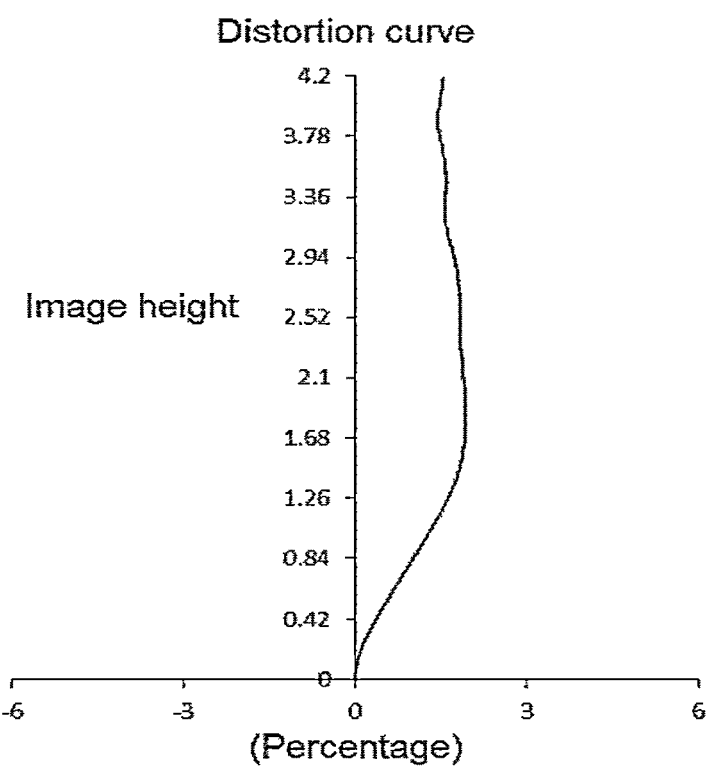

FIG. 14A shows a longitudinal aberration curve of the optical imaging lens assembly according to embodiment 5 under a minimum F-number to represent deviation of a convergence focal point after light with different wavelengths passes through the lens assembly. FIG. 14B shows an astigmatism curve of the optical imaging lens assembly according to embodiment 5 under a minimum F-number to represent a tangential image surface curvature and a sagittal image surface curvature. FIG. 14C shows a distortion curve of the optical imaging lens assembly according to embodiment 5 under a minimum F-number to represent distortion values corresponding to different fields of view. FIG. 15A shows a longitudinal aberration curve of the optical imaging lens assembly according to embodiment 5 under a maximum F-number to represent deviation of a convergence focal point after light with different wavelengths passes through the lens assembly. FIG. 15B shows an astigmatism curve of the optical imaging lens assembly according to embodiment 5 under a maximum F-number to represent a tangential image surface curvature and a sagittal image surface curvature. FIG. 15C shows a distortion curve of the optical imaging lens assembly according to embodiment 5 under a maximum F-number to represent distortion values corresponding to different fields of view. According to FIGS. 14A to 15C, it can be seen that the optical imaging lens assembly provided in embodiment 5 may achieve high imaging quality.

Embodiment 6

Figure 16A:
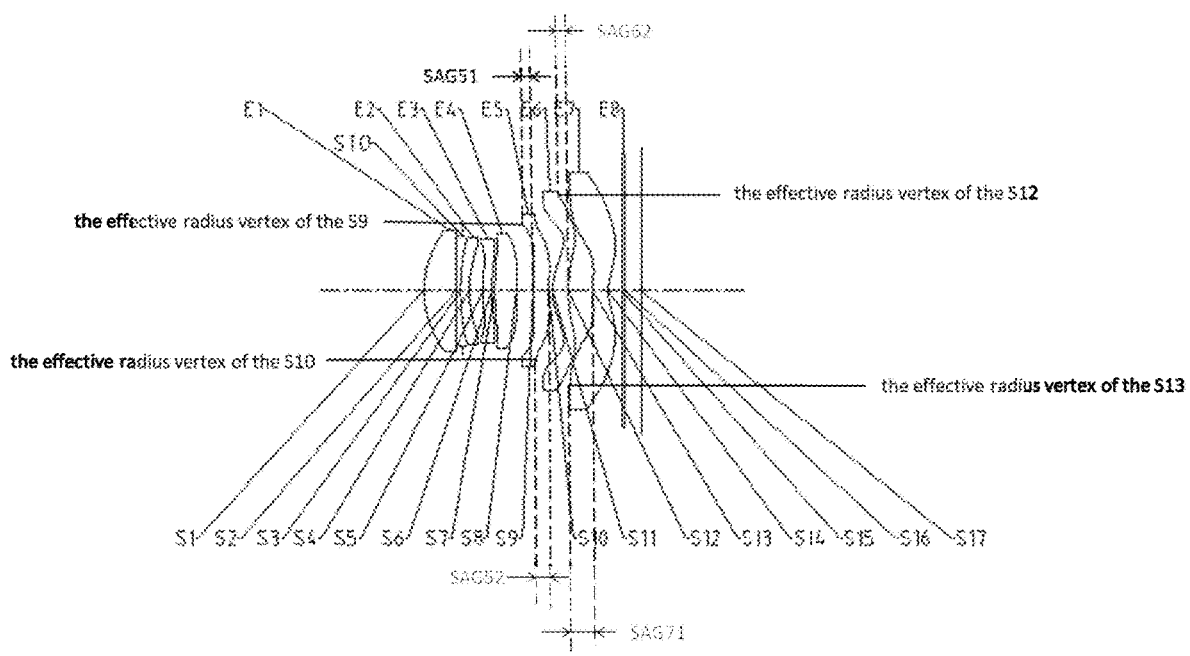
FIGS. 16A and 16B are a structure diagrams of an optical imaging lens assembly according to embodiment 6 of the disclosure respectively.
Figure 16B:
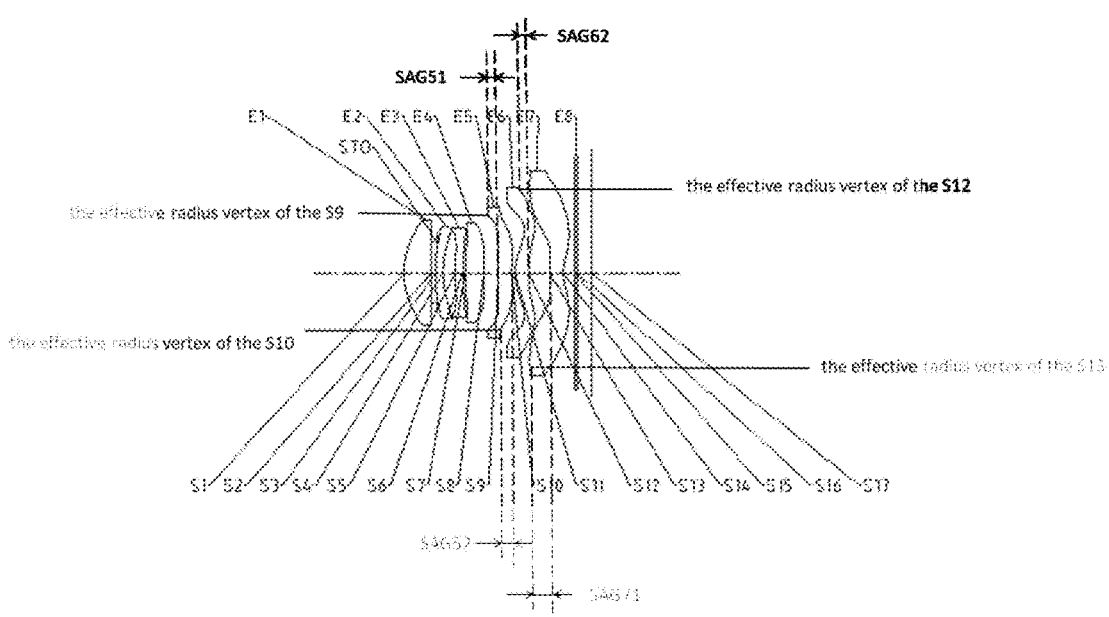

An optical imaging lens assembly according to embodiment 6 of the disclosure will be described below with reference to FIGS. 16A to 18C. FIG. 16A is a structure diagram of an optical imaging lens assembly according to embodiment 6 of the disclosure.

As shown in FIG. 16A, the optical imaging lens assembly sequentially includes, from an object side to an image side along an optical axis, a first lens E1, a diaphragm STO, a second lens E2, a third lens E3, a fourth lens E4, a fifth lens E5, a sixth lens E6, a seventh lens E7, and an optical filter E8.

The first lens E1 has a positive refractive power, an object-side surface S1 thereof is a convex surface, while an image-side surface S2 is a concave surface. The second lens E2 has a negative refractive power, an object-side surface S3 thereof is a convex surface, while an image-side surface S4 is a concave surface. The third lens E3 has a negative refractive power, an object-side surface S5 thereof is a convex surface, while an image-side surface S6 is a concave surface. The fourth lens E4 has a positive refractive power, an object-side surface S7 thereof is a convex surface, while an image-side surface S8 is a concave surface. The fifth lens E5 has a negative refractive power, an object-side surface S9 thereof is a convex surface, while an image-side surface S10 is a concave surface. The sixth lens E6 has a positive refractive power, an object-side surface S11 thereof is a convex surface, while an image-side surface S12 is a concave surface. The seventh lens E7 has a negative refractive power, an object-side surface S13 thereof is a convex surface, while an image-side surface S14 is a concave surface. The optical filter E8 has an object-side surface S15 and an image-side surface S16. The optical imaging lens assembly has an imaging surface S17. Light from an object sequentially penetrates through each of the surfaces S1 to S16 and is finally imaged on the imaging surface S17.

In embodiment 6, a value of a total effective focal length f of the optical imaging lens assembly is 4.78 mm. FNOmin is a minimum value of an F-number of the optical imaging lens assembly, and a value of FNOmin is 1.39. FNOmax is a maximum value of the F-number of the optical imaging lens assembly, and a value of FNOmax is 2.02. TTL is an on-axis distance from the object-side surface S1 of the first lens E1 to the imaging surface S17, and a value of TTL is 6.30 mm. InngH is a half of a diagonal length of an effective pixel region on the imaging surface S17, and a value of InngH is 4.18 mm.

Table 11 shows a basic parameter table of the optical imaging lens assembly of embodiment 6, and units of the curvature radius, the thickness and the focal length are all millimeter (mm). Table 12 shows high-order coefficients that can be used for each aspheric mirror surface in embodiment 6. A surface type of each aspheric surface may be defined by the formula (1) given in embodiment 1.

TABLE 11

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| S1 | Aspheric | 2.7106 | 0.9215 | 1.55 | 56.1 | 4.96 | −0.1197 |
| S2 | Spherical | 1.0000E+18 | 0.1969 | | | | |
| STO | Spherical | Infinite | −0.0469 | | | | |
| S3 | Aspheric | 4.8489 | 0.2550 | 1.68 | 19.2 | −9.75 | 5.1880 |
| S4 | Aspheric | 2.7375 | 0.4061 | | | | 0.0278 |
| S5 | Aspheric | 6.7176 | 0.2500 | 1.68 | 19.2 | −24.13 | −43.4702 |
| S6 | Aspheric | 4.6900 | 0.0900 | | | | −1.0000 |
| S7 | Aspheric | 6.5252 | 0.6258 | 1.57 | 37.3 | 13.20 | −1.0000 |
| S8 | Aspheric | 47.1335 | 0.4746 | | | | 0.0000 |
| S9 | Aspheric | 12.6550 | 0.4540 | 1.55 | 56.1 | −13.25 | 0.0000 |
| S10 | Aspheric | 4.5451 | 0.1118 | | | | −7.7241 |
| S11 | Aspheric | 1.7093 | 0.4595 | 1.55 | 56.1 | 4.12 | −1.0000 |
| S12 | Aspheric | 6.4374 | 0.7053 | | | | −1.0000 |
| S13 | Aspheric | 3.0910 | 0.4500 | 1.55 | 56.1 | −4.72 | −25.6795 |
| S14 | Aspheric | 1.3335 | 0.3820 | | | | −1.1245 |
| S15 | Spherical | Infinite | 0.1100 | 1.52 | 64.2 | | |
| S16 | Spherical | Infinite | 0.4543 | | | | |
| S17 | Spherical | Infinite | | | | | |

TABLE 12

| Surface number | A4 | A6 | A8 | A10 | A12 | A14 | A16 |
|---|---|---|---|---|---|---|---|
| S1 | −6.4472E−03 | 3.2262E−02 | −1.2963E−01 | 3.3012E−01 | −5.5656E−01 | 6.3722E−01 | −5.0605E−01 |
| S3 | −4.8443E−02 | 9.4225E−02 | −5.3365E−01 | 2.1224E+00 | −5.5335E+00 | 9.9177E+00 | −1.2589E+01 |
| S4 | −4.3875E−02 | −4.6248E−02 | 3.7768E−01 | −1.4224E+00 | 3.3565E+00 | −5.2604E+00 | 5.6108E+00 |
| S5 | −2.4958E−02 | 1.4537E−01 | −8.7756E−01 | 2.9735E+00 | −6.7944E+00 | 1.0797E+01 | −1.2170E+01 |
| S6 | −5.4505E−02 | 1.1121E−01 | −3.1450E−01 | 5.8006E−01 | −6.5231E−01 | 3.0976E−01 | 2.3544E−01 |
| S7 | −5.6132E−02 | 5.4181E−02 | −4.6882E−02 | −9.2875E−02 | 5.1925E−01 | −1.1171E+00 | 1.4498E+00 |

TABLE 12-continued

| | | | | | | | |
|---|---|---|---|---|---|---|---|
| S8 | −2.5618E−02 | −1.2059E−01 | 6.5959E−01 | −2.2250E+00 | 4.9732E+00 | −7.7048E+00 | 8.4887E+00 |
| S9 | 1.5959E−03 | −8.7013E−02 | 1.7130E−01 | −1.2556E−01 | −1.3298E−01 | 4.2960E−01 | −5.2273E−01 |
| S10 | −9.6158E−02 | −1.7239E−01 | 4.4252E−01 | −5.4945E−01 | 4.6094E−01 | −2.8493E−01 | 1.3379E−01 |
| S11 | −3.2191E−02 | −1.1202E−01 | 2.0960E−01 | −2.7057E−01 | −1.6994E−01 | 8.1403E−02 | 8.1403E−02 |
| S12 | 5.6570E−02 | 5.1127E−02 | −2.1159E−01 | 2.5332E−01 | −1.7754E−01 | 8.2359E−02 | −2.6623E−02 |
| S13 | −2.2894E−01 | 1.1056E−01 | −4.7239E−02 | 1.6988E−02 | −2.5047E−03 | −8.3706E−04 | 5.5022E−04 |
| S14 | −3.4761E−01 | 2.7345E−01 | −1.8812E−01 | 1.0145E−01 | −4.0801E−02 | 1.2088E−02 | −2.6373E−03 |

| Surface number | A18 | A20 | A22 | A24 | A26 | A28 | A30 |
|---|---|---|---|---|---|---|---|
| S1 | 2.8151E−01 | −1.0930E−01 | 2.9005E−02 | −5.0132E−03 | 5.0841E−04 | −2.2949E−05 | 0.0000E+00 |
| S3 | 1.1490E+01 | −7.5647E+00 | 3.5583E+00 | −1.1655E+00 | 2.5237E−01 | −3.2450E−02 | 1.8750E−03 |
| S4 | −4.0900E+00 | 2.0046E+00 | −6.3138E−01 | 1.1537E−01 | −9.2896E−03 | 0.0000E+00 | 0.0000E+00 |
| S5 | 9.8033E+00 | −5.6101E+00 | 2.2303E+00 | −5.8639E−01 | 9.1801E−02 | −6.4875E−03 | 0.0000E+00 |
| S6 | −5.2896E−01 | 4.4031E−01 | −2.1177E−01 | 6.1374E−02 | −9.9731E−03 | 6.9942E−04 | 0.0000E+00 |
| S7 | −1.2393E+00 | 7.1292E−01 | −2.7310E−01 | 6.6702E−02 | −9.3790E−03 | 5.7654E−04 | 0.0000E+00 |
| S8 | −6.7371E+00 | 3.8590E+00 | −1.5794E+00 | 4.5008E−01 | −8.4765E−02 | 9.4764E−03 | −4.7587E−04 |
| S9 | 3.8941E−01 | −1.9490E−01 | 6.7048E−02 | −1.5680E−02 | 2.3842E−03 | −2.1264E−04 | 8.4377E−06 |
| S10 | −4.8244E−02 | 1.3347E−02 | −2.7862E−03 | 4.2295E−04 | −4.3747E−05 | 2.7370E−06 | −7.7694E−08 |
| S11 | −2.7915E−02 | 6.8649E−03 | −1.2001E−03 | 1.4543E−04 | −1.1601E−05 | 5.4747E−07 | −1.1570E−08 |
| S12 | 6.1483E−03 | −1.0219E−03 | 1.2127E−04 | −1.0015E−05 | 5.4588E−07 | −1.7620E−08 | 2.5444E−10 |
| S13 | −1.4697E−04 | 2.3957E−05 | −2.5827E−06 | 1.8591E−07 | −8.6321E−09 | 2.3451E−10 | −2.8374E−12 |
| S14 | 4.2405E−04 | −5.0050E−05 | 4.2808E−06 | −2.5816E−07 | 1.0411E−08 | −2.5204E−10 | 2.7698E−12 |

Figure 17A:
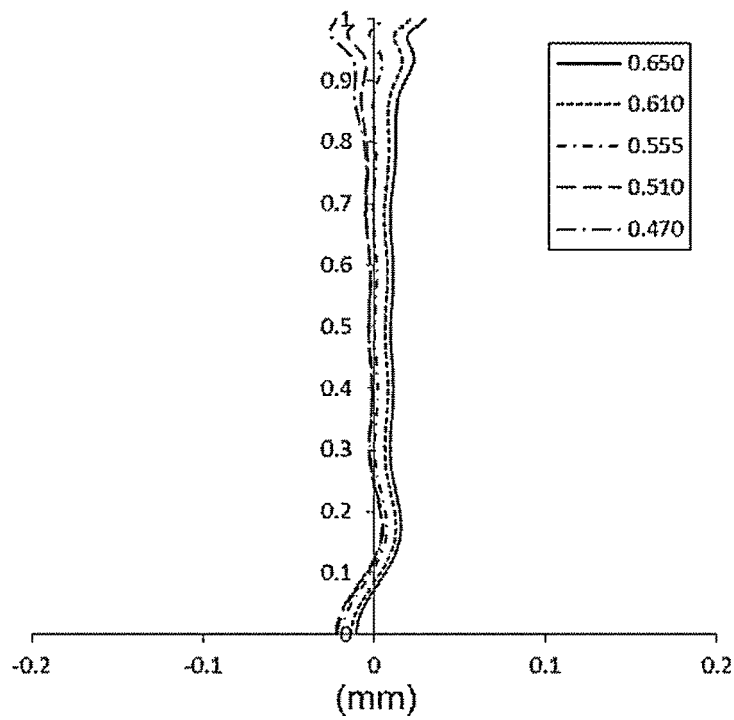
FIGS. 17A to 17C show a longitudinal aberration curve, an astigmatism curve and a distortion curve of an optical imaging lens assembly under a maximum F-number according to embodiment 6 respectively.
Figure 17B:
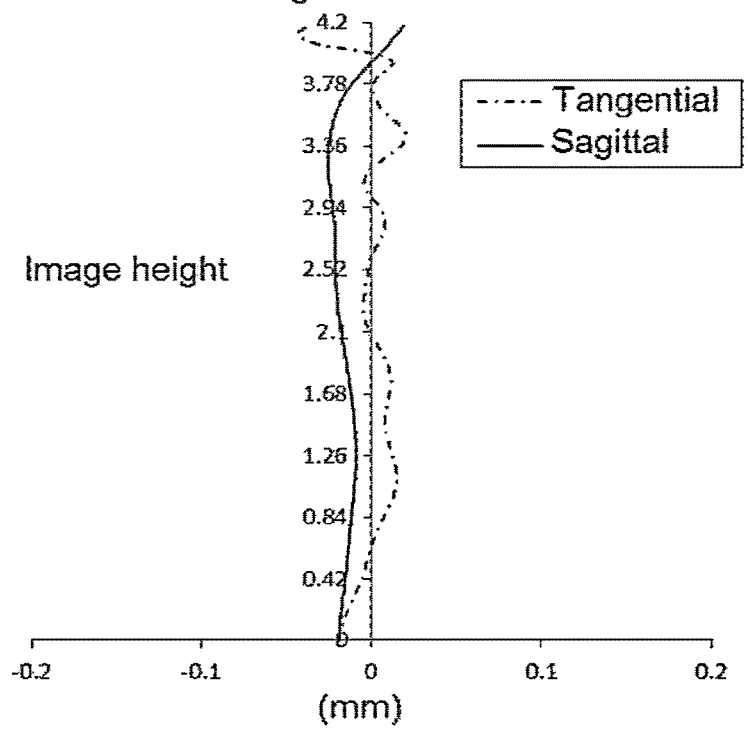
Figure 17C:
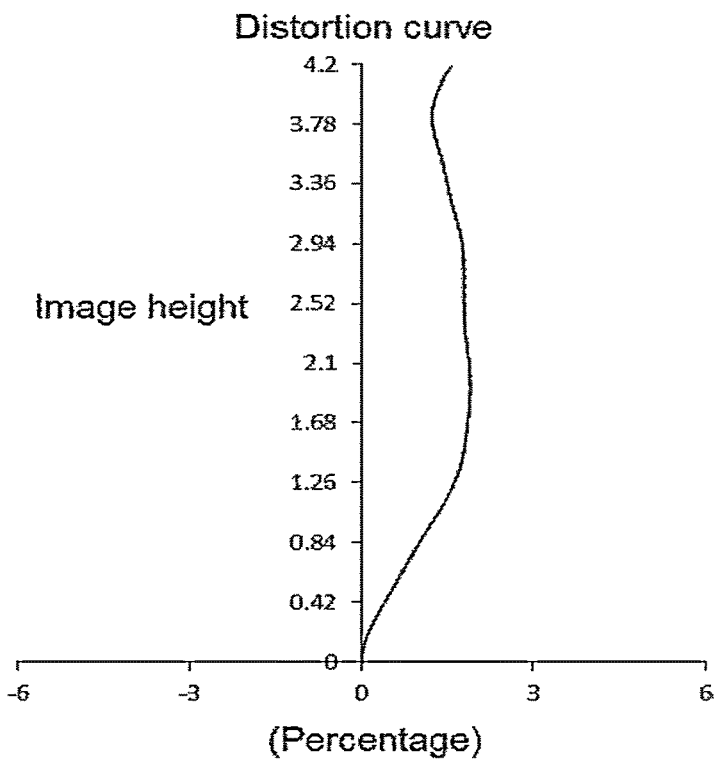
Figure 18A:
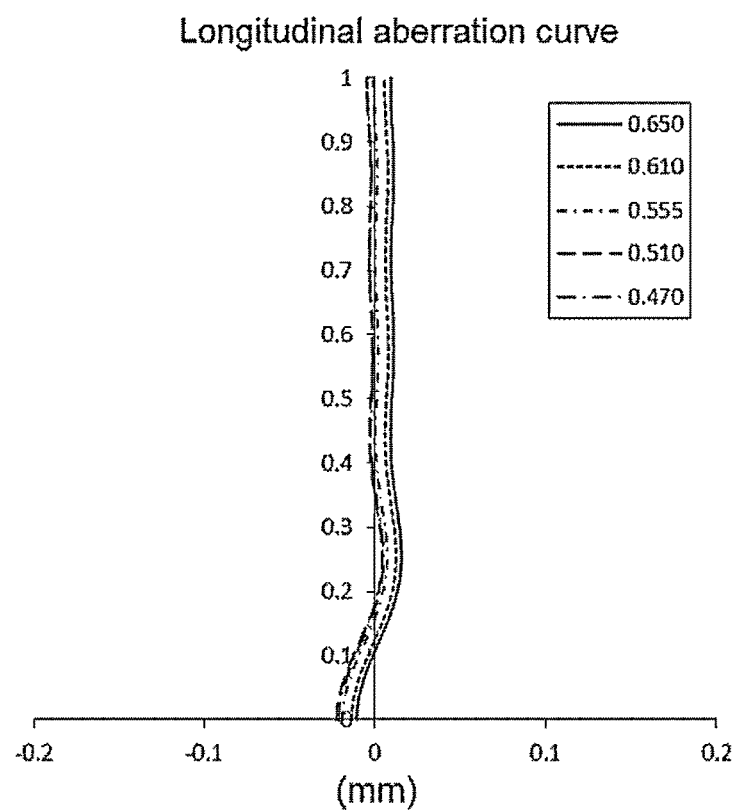
FIGS. 18A to 18C show a longitudinal aberration curve, an astigmatism curve and a distortion curve of an optical imaging lens assembly under a minimum F-number according to embodiment 6 respectively.
Figure 18B:
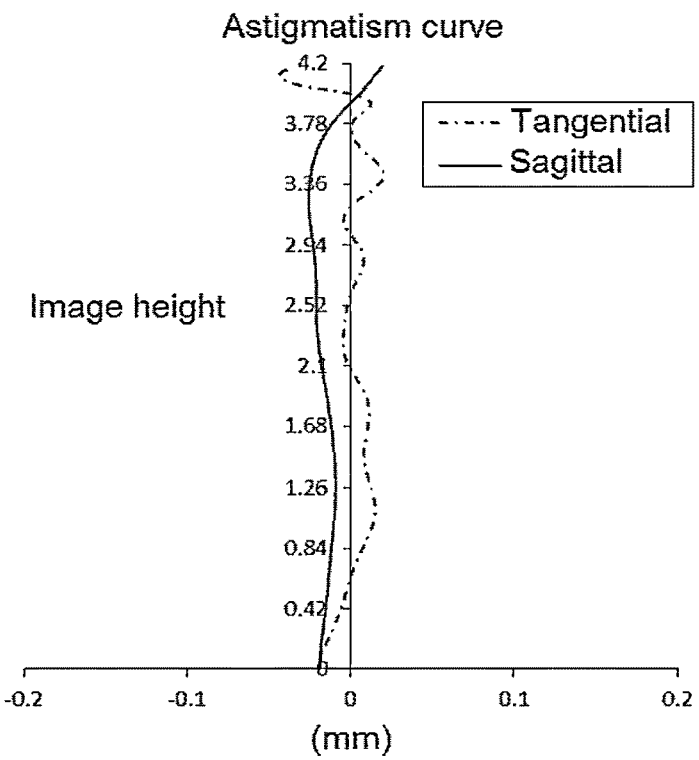
Figure 18C:
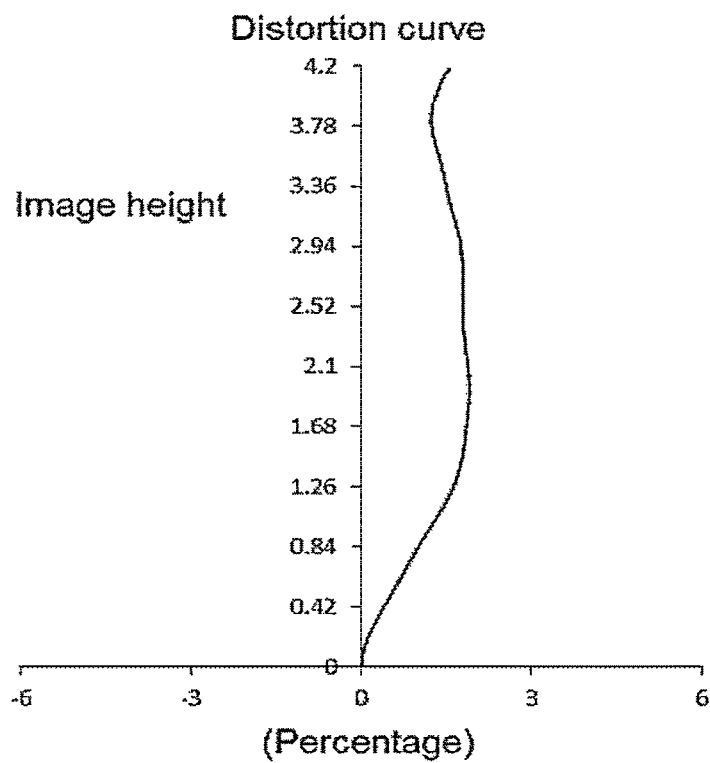

FIG. 17A shows a longitudinal aberration curve of the optical imaging lens assembly according to embodiment 6 under a minimum F-number to represent deviation of a convergence focal point after light with different wavelengths passes through the lens assembly. FIG. 17B shows an astigmatism curve of the optical imaging lens assembly according to embodiment 6 under a minimum F-number to represent a tangential image surface curvature and a sagittal image surface curvature. FIG. 17C shows a distortion curve of the optical imaging lens assembly according to embodiment 6 under a minimum F-number to represent distortion values corresponding to different fields of view. FIG. 18A shows a longitudinal aberration curve of the optical imaging lens assembly according to embodiment 6 under a maximum F-number to represent deviation of a convergence focal point after light with different wavelengths passes through the lens assembly. FIG. 18B shows an astigmatism curve of the optical imaging lens assembly according to embodiment 6 under a maximum F-number to represent a tangential image surface curvature and a sagittal image surface curvature. FIG. 18C shows a distortion curve of the optical imaging lens assembly according to embodiment 6 under a maximum F-number to represent distortion values corresponding to different fields of view. According to FIGS. 17A to 18C, it can be seen that the optical imaging lens assembly provided in embodiment 6 may achieve high imaging quality.

From the above, embodiment 1 to embodiment 6 meet a relationship shown in Table 13 respectively.

TABLE 13

| Conditional expression/embodiment | 1 | 2 | 3 | 4 | 5 | 6 |
|---|---|---|---|---|---|---|
| f/(EPDmax-EPDmin) | 4.50 | 4.45 | 4.51 | 4.42 | 4.45 | 4.44 |
| (f2 + f5)/f3 | 0.90 | 1.01 | 0.75 | 1.22 | 0.93 | 0.95 |
| f1/EPDmax | 1.66 | 1.64 | 1.51 | 1.49 | 1.44 | 1.44 |
| (R14-R13)/f7 | 2.06 | 0.69 | 1.59 | 0.58 | 0.51 | 0.37 |
| (R5 + R6)/(R3 + R4) | 1.65 | 1.85 | 1.80 | 1.73 | 1.67 | 1.50 |
| CT1/(CT5 + CT6) | 0.95 | 1.00 | 1.00 | 0.94 | 0.97 | 1.01 |
| f/Δ DT | 8.45 | 8.46 | 8.76 | 8.68 | 8.67 | 8.69 |
| f12/f56 | 1.71 | 1.58 | 1.62 | 1.62 | 1.52 | 1.35 |
| SAG52/SAG51 | 1.72 | 1.56 | 1.45 | 1.54 | 1.28 | 1.23 |
| T67/(SAG62-SAG71) | 2.06 | 1.93 | 1.93 | 2.78 | 2.47 | 2.15 |

The disclosure also provides an imaging device, which is provided with an electronic photosensitive element for imaging. The electronic photosensitive element may be a Charge Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the above-mentioned optical imaging lens assembly.

The above description is only description about the preferred embodiments of the disclosure and adopted technical principles. It is understood by those skilled in the art that the scope of protection involved in the disclosure is not limited to the technical solutions formed by specifically combining the technical characteristics and should also cover other technical solutions formed by freely combining the technical characteristics or equivalent characteristics thereof without departing from the concept of the disclosure, for example, technical solutions formed by mutually replacing the characteristics and (but not limited to) the technical characteristics with similar functions disclosed in the disclosure.

What is claimed is:

1. An optical imaging lens assembly, sequentially comprising, from an object side to an image side along an optical axis:
   a first lens with a positive refractive power,
   a variable diaphragm,
   a second lens,
   a third lens,
   a fourth lens,
   a fifth lens with a negative refractive power, a sixth lens with a positive refractive power, and
a seventh lens with a negative refractive power,
an object-side surface of the second lens is a convex surface, while an image-side surface of the second lens is a concave surface, an object-side surface of the third lens is a convex surface, while an image-side surface of the third lens is a concave surface;
wherein EPDmax is a maximum entrance pupil diameter of the optical imaging lens assembly, EPDmin is a minimum entrance pupil diameter of the optical imaging lens assembly, and EPDmax, EPDmin and a total effective focal length f of the optical imaging lens assembly meet:

$3.0<f/(EPD\max-EPD\min)<6.0;$ an effective focal length f2 of the second lens, an effective focal length f5 of the fifth lens and an effective focal length f3 of the third lens meet:

$0.5<(f2+f5)/f3<1.5;$ a curvature radius R5 of an object-side surface of the third lens, a curvature radius R6 of an image-side surface of the third lens, a curvature radius R3 of an object-side surface of the second lens and a curvature radius R4 of an image-side surface of the second lens meet:

$1.4<(R5+R6)/(R3+R4)<2.1.$

2. The optical imaging lens assembly according to claim 1, wherein EPDmax is the maximum entrance pupil diameter of the optical imaging lens assembly, and an effective focal length f1 of the first lens and EPDmax meet:

$1.2<f1/EPD\max<1.8.$

3. The optical imaging lens assembly according to claim 1, wherein $\Delta DT$ is a maximum variation of a clear aperture of the variable diaphragm, and the total effective focal length f of the optical imaging lens assembly and $\Delta DT$ meet:

$7<f/\Delta DT<9.$

4. The optical imaging lens assembly according to claim 1, wherein a curvature radius R14 of an image-side surface of the seventh lens, a curvature radius R13 of an object-side surface of the seventh lens and an effective focal length f7 of the seventh lens meet:

$0.3<(R14-R13)/f7<2.1.$

5. The optical imaging lens assembly according to claim 1, wherein a center thickness CT1 of the first lens on the optical axis, a center thickness CT5 of the fifth lens on the optical axis and a center thickness CT6 of the sixth lens on the optical axis meet:

$0.9<CT1/(CT5+CT6)<1.3.$

6. The optical imaging lens assembly according to claim 1, wherein a combined focal length f12 of the first lens and the second lens and a combined focal length f56 of the fifth lens and the sixth lens meet:

$1.3<f12/f56<1.8.$

7. The optical imaging lens assembly according to claim 1, wherein SAG52 is an on-axis distance from an intersection point of an image-side surface of the fifth lens and the optical axis to an effective radius vertex of the image-side surface of the fifth lens, SAG51 is an on-axis distance from an intersection point of an object-side surface of the fifth lens and the optical axis to an effective radius vertex of the object-side surface of the fifth lens, and SAG52 and SAG51 meet $1.2<SAG52/SAG51<1.8.$ 8. The optical imaging lens assembly according to claim 1, wherein SAG62 is an on-axis distance from an intersection point of an image-side surface of the sixth lens and the optical axis to an effective radius vertex of the image-side surface of the sixth lens, SAG71 is an on-axis distance from an intersection point of an object-side surface of the seventh lens and the optical axis to an effective radius vertex of the object-side surface of the seventh lens, and a spacing distance T67 of the sixth lens and the seventh lens on the optical axis, SAG62 and SAG71 meet $1.8<T67/(SAG62-SAG71)<2.8.$ 9. An optical imaging lens assembly, sequentially comprising, from an object side to an image side along an optical axis:
a first lens with a positive refractive power,
a variable diaphragm,
a second lens,
a third lens,
a fourth lens,
a fifth lens with a negative refractive power,
a sixth lens with a positive refractive power, and
a seventh lens with a negative refractive power,
an object-side surface of the second lens is a convex surface, while an image-side surface of the second lens is a concave surface, an object-side surface of the third lens is a convex surface, while an image-side surface of the third lens is a concave surface;
wherein EPDmax is a maximum entrance pupil diameter of the optical imaging lens assembly, and an effective focal length f1 of the first lens and EPDmax meet $1.2<f1/EPD\max<1.8;$
an effective focal length f2 of the second lens, an effective focal length f5 of the fifth lens and an effective focal length f3 of the third lens meet:

$0.5<(f2+f5)/f3<1.5;$ a curvature radius R5 of an object-side surface of the third lens, a curvature radius R6 of an image-side surface of the third lens, a curvature radius R3 of an object-side surface of the second lens and a curvature radius R4 of an image-side surface of the second lens meet:

$1.4<(R5+R6)/(R3+R4)<2.1.$

10. The optical imaging lens assembly according to claim 9, wherein EPDmax is the maximum entrance pupil diameter of the optical imaging lens assembly, EPDmin is a minimum entrance pupil diameter of the optical imaging lens assembly, and EPDmax, EPDmin and a total effective focal length f of the optical imaging lens assembly meet $3.0<f/(EPD\max-EPD\min)<6.0.$ 11. The optical imaging lens assembly according to claim 9, wherein $\Delta DT$ is a maximum variation of a clear aperture of the variable diaphragm, and a total effective focal length f of the optical imaging lens assembly and $\Delta DT$ meet $7<f/\Delta DT<9.$ 12. The optical imaging lens assembly according to claim 9, wherein a curvature radius R14 of an image-side surface of the seventh lens, a curvature radius R13 of an object-side surface of the seventh lens and an effective focal length f7 of the seventh lens meet $0.3<(R14-R13)/f7<2.1.$ 13. The optical imaging lens assembly according to claim 9, wherein a center thickness CT1 of the first lens on the optical axis, a center thickness CT5 of the fifth lens on the optical axis and a center thickness CT6 of the sixth lens on the optical axis meet $0.9<CT1/(CT5+CT6)<1.3.$ 14. The optical imaging lens assembly according to claim 9, wherein a combined focal length f12 of the first lens and the second lens and a combined focal length f56 of the fifth lens and the sixth lens meet 1.3<f12/f56<1.8.

* * * * *